US009183705B2

(12) United States Patent
Yoseloff et al.

(10) Patent No.: US 9,183,705 B2
(45) **Date of Patent: *Nov. 10, 2015**

(54) METHODS OF PLAYING WAGERING GAMES

(71) Applicant: Bally Gaming, Inc., Las Vegas, NV (US)

(72) Inventors: Mark L. Yoseloff, Henderson, NV (US); Louis J. Castle, II, Las Vegas, NV (US); Roger M. Snow, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/034,304

(22) Filed: Sep. 23, 2013

(65) Prior Publication Data

US 2014/0087799 A1 Mar. 27, 2014

Related U.S. Application Data

(63) Continuation-in-part of application No. 13/631,825, filed on Sep. 28, 2012, now Pat. No. 8,590,900, which is a continuation of application No. 13/399,141, filed on Feb. 17, 2012, which is a continuation of (Continued)

(51) Int. Cl.
*A63F 13/00* (2014.01)
*G07F 17/32* (2006.01)

(Continued)

(52) U.S. Cl.
CPC .......... *G07F 17/3293* (2013.01); *G07F 17/322* (2013.01); *G07F 17/3267* (2013.01); *A63F 2001/005* (2013.01); *A63F 2001/008* (2013.01); *A63F 2003/00164* (2013.01)

(58) Field of Classification Search
CPC .................. A63F 2001/005; A63F 2001/008; A63F 2003/00164; G07F 17/3293; G07F 17/322
USPC ...................... 273/292, 274, 309; 463/13, 12
See application file for complete search history.

(56) References Cited

U.S. PATENT DOCUMENTS

| | | | |
|---|---|---|---|
| 1,238,736 | A | 9/1917 | Barrett |
| 1,527,929 | A | 2/1925 | Simons |

(Continued)

FOREIGN PATENT DOCUMENTS

| | | |
|---|---|---|
| AU | 200135060 | 10/2001 |
| CA | 2 529 076 A1 | 6/2006 |

(Continued)

OTHER PUBLICATIONS

United States Office Action, U.S. Appl. No. 13/624,743, Jan. 29, 2013, 7 pages.

(Continued)

*Primary Examiner* — Benjamin Layno
(74) *Attorney, Agent, or Firm* — Marvin A. Hein; Philip J. Anderson; Traskbritt, P.C.

(57) ABSTRACT

A card game is played against a pay table, wherein a player receives a partial hand that is preferably completed by community cards, but may be completed by cards dealt directly to a hand or a combination of cards dealt directly to a hand and at least one community card or wild card. After placement of an ante wager, each player will have an opportunity to place a game wager before receiving another card for the player's hand (whether dealt directly to the player or as a community card revealed to all players). At least some or all game wagers may be an amount within a range of multiples of the player's ante wager, such as one times, two times, three times, four times, or five times the amount of the ante wager. The range of wagers may remain the same or vary with the number of dealt cards or community cards revealed to the players.

29 Claims, 10 Drawing Sheets

Related U.S. Application Data application No. 11/108,159, filed on Apr. 15, 2005, now abandoned, which is a continuation-in-part of application No. 10/938,483, filed on Sep. 10, 2004, now Pat. No. 7,264,243.

(51) Int. Cl.

*A63F 3/00* (2006.01)
*A63F 1/00* (2006.01)

(56) References Cited

U.S. PATENT DOCUMENTS 1,763,476 A 6/1930 Morris
1,970,876 A 8/1934 Anderson
2,008,829 A 7/1935 Israel
2,199,745 A 5/1940 Harris
3,011,789 A 12/1961 Eliassen
3,269,503 A 8/1966 Foster
3,556,531 A 1/1971 Elder
3,663,021 A 5/1972 Whippo
3,667,757 A 6/1972 Holmberg
3,689,071 A 9/1972 Kucera
3,796,433 A 3/1974 Bell et al.
3,825,255 A 7/1974 Kennard
3,876,208 A 4/1975 Wachtler et al.
4,063,680 A 12/1977 Leo
4,099,722 A 7/1978 Rodesch et al.
4,232,866 A 11/1980 Pennachio
4,302,012 A 11/1981 Di Giovanni et al.
4,305,586 A 12/1981 Richards et al.
4,364,567 A 12/1982 Goott et al.
4,397,469 A 8/1983 Carter
4,518,001 A 5/1985 Branham
4,531,187 A 7/1985 Uhland et al.
4,575,085 A 3/1986 Ollington
4,614,342 A 9/1986 Takashima
4,624,459 A 11/1986 Kaufman et al.
4,648,604 A 3/1987 Horan et al.
4,651,997 A 3/1987 Wood et al.
4,700,948 A 10/1987 Okada
4,721,307 A 1/1988 Okada
4,743,022 A 5/1988 Wood
4,756,531 A 7/1988 Dire et al.
4,759,549 A 7/1988 Beckwith et al.
4,760,527 A 7/1988 Sidley
4,813,675 A 3/1989 Greenwood et al.
4,836,546 A 6/1989 Dire et al.
4,836,553 A 6/1989 Suttle et al.
4,837,728 A 6/1989 Barrie et al.
4,861,041 A 8/1989 Jones et al.
4,948,134 A 8/1990 Suttle et al.
4,964,638 A 10/1990 Ishida
5,022,653 A 6/1991 Suttle et al.
5,046,736 A 9/1991 Bridgeman et al.
5,078,405 A 1/1992 Jones et al.
5,098,107 A 3/1992 Boylan et al.
5,100,137 A 3/1992 Fulton et al.
5,112,060 A 5/1992 Jones et al.
5,167,413 A 12/1992 Fulton et al.
5,174,579 A 12/1992 Griffiths
5,221,083 A 6/1993 Dote et al.
5,242,163 A 9/1993 Fulton et al.
5,251,897 A 10/1993 Fulton et al.
5,255,915 A 10/1993 Miller
5,257,784 A 11/1993 Boylan et al.
5,257,810 A 11/1993 Schorr et al.
5,265,877 A 11/1993 Boylan et al.
5,275,415 A 1/1994 Wisted et al.
5,288,077 A 2/1994 Jones et al.
5,288,081 A 2/1994 Breeding et al.
5,294,128 A 3/1994 Marquez et al.
5,308,065 A 5/1994 Bridgeman et al.
5,322,295 A 6/1994 Cabot et al.
5,324,035 A 6/1994 Morris et al.
5,337,973 A 8/1994 Matsumoto et al.
5,364,104 A 11/1994 Jones et al.
5,366,228 A 11/1994 Kangsanaraks et al.
5,377,973 A 1/1995 Jones et al.
5,377,993 A 1/1995 Josephs et al.
5,377,994 A 1/1995 Jones et al.
5,395,120 A 3/1995 Malek et al.
5,397,128 A 3/1995 Hesse et al.
5,411,257 A 5/1995 Fulton et al.
5,413,353 A 5/1995 Demarest et al.
5,417,430 A 5/1995 Breeding et al.
5,423,551 A 6/1995 Stavinsky et al.
5,431,408 A 7/1995 Adams et al.
5,437,451 A 8/1995 Fulton et al.
5,489,101 A 2/1996 Moody et al.
5,494,295 A 2/1996 Potter et al.
5,505,449 A 4/1996 Eberhardt et al.
5,531,448 A 7/1996 Moody et al.
5,538,252 A 7/1996 Green et al.
5,584,486 A 12/1996 Franklin et al.
5,597,162 A 1/1997 Franklin et al.
5,603,502 A 2/1997 Nagagawa
5,630,757 A 5/1997 Gagin et al.
5,636,842 A 6/1997 Cabot et al.
5,649,705 A 7/1997 String et al.
5,653,444 A 8/1997 Dahl et al.
5,657,993 A 8/1997 Merlino et al.
5,660,393 A 8/1997 Dreger et al.
5,669,817 A 9/1997 Tarantino et al.
5,673,917 A 10/1997 Vancura et al.
5,685,774 A 11/1997 Webb
5,697,614 A 12/1997 Potter et al.
5,707,286 A 1/1998 Carlson
5,711,525 A 1/1998 Breeding
5,718,430 A 2/1998 Aramapakul et al.
5,732,950 A 3/1998 Moody et al.
5,741,183 A 4/1998 Acres et al.
5,752,702 A 5/1998 McDoniel et al.
5,762,340 A 6/1998 Feola et al.
RE35,864 E 7/1998 Weingardt
5,806,855 A 9/1998 Cherry et al.
5,810,354 A 9/1998 Banyai et al.
5,820,460 A 10/1998 Fulton et al.
5,823,873 A 10/1998 Moody et al.
5,830,069 A 11/1998 Soltesz et al.
5,851,011 A 12/1998 Lott et al.
5,851,149 A 12/1998 Xidos et al.
5,865,437 A 2/1999 Moore et al.
5,876,283 A 3/1999 Parra et al.
5,897,436 A 4/1999 Singer et al.
5,901,958 A 5/1999 Andrews et al.
5,928,081 A 7/1999 Bochichio et al.
5,944,315 A 8/1999 Mostashari et al.
5,975,529 A 11/1999 De Keller et al.
5,988,643 A 11/1999 Awada et al.
5,999,808 A 12/1999 Ladue et al.
6,012,719 A 1/2000 Webb et al.
6,019,374 A 2/2000 Breeding et al.
6,027,119 A 2/2000 De Lisle
6,042,118 A 3/2000 Poitra et al.
6,056,641 A 5/2000 Webb
6,098,984 A 8/2000 Moore et al.
6,098,985 A 8/2000 Moody et al.
6,102,402 A 8/2000 Scott et al.
6,113,101 A 9/2000 Wirth et al.
6,113,103 A 9/2000 Mostashari et al.
6,142,872 A 11/2000 Walker et al.
6,149,154 A 11/2000 Grauzer et al.
6,170,827 B1 1/2001 Lombardo et al.
6,196,918 B1 3/2001 Miers et al.
6,206,373 B1 3/2001 Garrod
6,206,374 B1 3/2001 Jones
6,206,780 B1 3/2001 Awada
6,210,274 B1 4/2001 Carlson
6,229,534 B1 5/2001 Gerra et al.
6,237,916 B1 5/2001 Webb
6,270,079 B1 8/2001 Chamberlain
6,272,223 B1 8/2001 Carlson
6,273,424 B1 8/2001 Breeding

(56) References Cited

U.S. PATENT DOCUMENTS 6,279,910 B1 8/2001 de Keller
D452,283 S 12/2001 Regan, II et al.
6,325,375 B1 12/2001 Potter et al.
6,332,614 B1 12/2001 Hesse
6,334,614 B1 1/2002 Breeding
6,336,859 B2 1/2002 Jones et al.
6,345,823 B1 2/2002 Webb
6,375,189 B1 4/2002 Jones
6,406,024 B1 6/2002 Perkins
6,409,602 B1 6/2002 Wiltshire et al.
6,428,005 B2 8/2002 Au-Yeung
6,467,771 B1 10/2002 deKeller
6,478,675 B1 11/2002 Awada
6,485,368 B2 11/2002 Jones et al.
6,517,072 B1 2/2003 McInerney
6,517,074 B1 2/2003 Moody et al.
6,533,658 B1 3/2003 Walker
6,561,897 B1 5/2003 Bourbour et al.
6,568,680 B1 5/2003 Moody et al.
6,581,936 B1 6/2003 Zoccolillo et al.
6,588,750 B1 7/2003 Grauzer et al.
6,607,443 B1 8/2003 Miyamoto et al.
6,637,747 B1 10/2003 Garrod
6,651,981 B2 11/2003 Grauzer et al.
6,651,982 B2 11/2003 Grauzer et al.
6,652,377 B1 11/2003 Moody
6,655,684 B2 12/2003 Grauzer et al.
6,698,759 B2 3/2004 Webb et al.
6,705,943 B2 3/2004 Awada
6,712,702 B2 3/2004 Goldberg et al.
6,719,291 B1 4/2004 deKeller
6,726,564 B2 4/2004 Hogan et al.
6,749,200 B2 6/2004 Yurkins
6,749,510 B2 6/2004 Giobbi
6,752,394 B2 6/2004 Malcolm
6,755,741 B1 6/2004 Rafaeli
6,802,773 B2 10/2004 Moody
6,811,153 B1 11/2004 Ko
6,827,348 B1 12/2004 Mitchell
6,869,076 B1 3/2005 Moore
6,896,265 B1 5/2005 Schlumbrecht
6,899,628 B2 5/2005 Leen et al.
6,923,446 B2 8/2005 Snow
6,929,264 B2 8/2005 Huard et al.
6,955,356 B2 10/2005 Moody
6,959,928 B2 11/2005 Schultz
6,964,418 B2 11/2005 Moody
6,986,514 B2 1/2006 Snow
D518,112 S 3/2006 Abbott et al.
D519,164 S 4/2006 Austin
7,029,011 B2 4/2006 Strong et al.
7,056,215 B1 6/2006 Olive
7,108,603 B2 9/2006 Olive
7,128,652 B1 10/2006 Lavoie et al.
7,140,964 B2 11/2006 Walker
7,165,770 B2 1/2007 Snow
7,175,522 B2 2/2007 Hartl
7,186,181 B2 3/2007 Rowe
7,189,161 B1 3/2007 Wilshire et al.
7,203,841 B2 4/2007 Jackson et al.
7,246,799 B2 7/2007 Snow
D548,799 S 8/2007 Looney et al.
7,264,243 B2 9/2007 Yoseloff et al.
7,297,062 B2 11/2007 Gatto et al.
7,303,473 B2 12/2007 Rowe
7,331,580 B2 2/2008 Scibetta
7,387,300 B2 6/2008 Snow
7,438,295 B2 10/2008 Aida
7,510,478 B2 3/2009 Benbrahim et al.
7,515,718 B2 4/2009 Nguyen et al.
7,516,959 B2 4/2009 Huard et al.
7,537,456 B2 5/2009 Snow
7,611,404 B1 11/2009 Hilf et al.
7,661,676 B2 2/2010 Smith et al.
7,666,095 B2 2/2010 Van Luchene
7,744,452 B2 6/2010 Cimring et al.
7,780,529 B2 8/2010 Rowe et al.
7,794,319 B2 9/2010 Luciano, Jr. et al.
7,824,255 B2 11/2010 Lutnick et al.
7,846,018 B2 12/2010 Baerlocher
7,867,091 B2 1/2011 Moshal
7,871,323 B2 1/2011 Walker et al.
7,905,770 B2 3/2011 Snow
7,909,689 B2 3/2011 Lardie
7,931,533 B2 4/2011 LeMay et al.
7,946,911 B2 5/2011 Vang et al.
7,988,554 B2 8/2011 LeMay et al.
8,062,134 B2 11/2011 Kelly et al.
8,070,574 B2 12/2011 Grauzer et al.
8,092,289 B2 1/2012 Mai
8,092,307 B2 1/2012 Kelly
8,092,309 B2 1/2012 Bickley
8,172,661 B1 5/2012 Hein
8,272,958 B2 9/2012 Smith et al.
8,590,900 B2 * 11/2013 Yoseloff ........................ 273/292
2001/0040345 A1 11/2001 Au-Yeung
2001/0048197 A1 12/2001 Lo
2002/0008356 A1 1/2002 De Keller
2002/0049909 A1 4/2002 Jackson et al.
2002/0103018 A1 8/2002 Rommerdahl et al.
2002/0113371 A1 8/2002 Snow
2002/0175468 A1 11/2002 Kenny et al.
2002/0195775 A1 12/2002 Webb et al.
2003/0042679 A1 3/2003 Snow
2003/0050106 A1 3/2003 Lyfoung
2003/0199316 A1 10/2003 Miyamoto et al.
2004/0023712 A1 2/2004 Oliver
2004/0100025 A1 5/2004 Conklin et al.
2004/0102234 A1 5/2004 Gold
2004/0150163 A1 8/2004 Kenny et al.
2004/0160006 A1 8/2004 Kenny et al.
2004/0178582 A1 9/2004 Garrod
2004/0180722 A1 9/2004 Giobbi
2004/0204231 A1 10/2004 Martin et al.
2004/0217548 A1 11/2004 Snow
2004/0224777 A1 11/2004 Smith et al.
2005/0029741 A1 2/2005 Snow et al.
2005/0032563 A1 2/2005 Sines
2005/0032564 A1 2/2005 Sines
2005/0051958 A1 3/2005 Snow
2005/0051962 A1 3/2005 Chapman
2005/0104292 A1 5/2005 Schultz
2005/0107148 A1 5/2005 Webb
2005/0127606 A1 6/2005 Snow et al.
2005/0143166 A1 6/2005 Walker et al.
2005/0146093 A1 7/2005 Grauzer et al.
2005/0164759 A1 7/2005 Smith et al.
2005/0164762 A1 7/2005 Smith et al.
2005/0192092 A1 9/2005 Breckner et al.
2005/0218596 A1 10/2005 Adam et al.
2005/0242506 A1 11/2005 Yoseloff
2005/0269782 A1 12/2005 Sklansky
2006/0040745 A1 2/2006 Wells et al.
2006/0058087 A1 3/2006 White et al.
2006/0068868 A1 * 3/2006 Crawford et al. ............... 463/13
2006/0068899 A1 3/2006 White et al.
2006/0084506 A1 4/2006 Yoseloff et al.
2006/0108740 A1 5/2006 Kekempanos et al.
2006/0119044 A1 6/2006 Kekempanos et al.
2006/0145417 A1 7/2006 Grauzer et al.
2006/0178183 A1 8/2006 Van Asdale
2006/0186599 A1 8/2006 Kenny et al.
2006/0189381 A1 8/2006 Daniel et al.
2006/0267285 A1 11/2006 Webb et al.
2006/0270477 A1 11/2006 Snow
2006/0281513 A1 12/2006 Kirkpatrick
2006/0281534 A1 12/2006 Grauzer et al.
2006/0284376 A1 12/2006 Snow
2006/0287103 A1 12/2006 Crawford, III et al.
2007/0024005 A1 2/2007 Snow
2007/0026935 A1 2/2007 Wolf et al.
2007/0055753 A1 3/2007 Robb
2007/0069462 A1 3/2007 Downs et al.
2007/0072677 A1 3/2007 Lavoie et al.

(56) References Cited

U.S. PATENT DOCUMENTS

| | | | |
|---|---|---|---|
| 2007/0102882 | A1 | 5/2007 | Snow |
| 2007/0111786 | A1 | 5/2007 | Snow |
| 2007/0184905 | A1 | 8/2007 | Gatto et al. |
| 2007/0197294 | A1 | 8/2007 | Gong |
| 2007/0197298 | A1 | 8/2007 | Rowe |
| 2007/0202941 | A1 | 8/2007 | Miltenberger et al. |
| 2007/0210520 | A1 | 9/2007 | Webb |
| 2007/0213116 | A1 | 9/2007 | Crawford et al. |
| 2007/0214058 | A1 | 9/2007 | Rouhi et al. |
| 2007/0225061 | A1 | 9/2007 | Naobayashi |
| 2008/0032763 | A1 | 2/2008 | Giobbi |
| 2008/0039192 | A1 | 2/2008 | Laut |
| 2008/0039208 | A1 | 2/2008 | Abrink et al. |
| 2008/0073840 | A1 | 3/2008 | Comeau |
| 2008/0096656 | A1 | 4/2008 | LeMay et al. |
| 2008/0136102 | A1 | 6/2008 | Hoover |
| 2008/0176627 | A1 | 7/2008 | Lardie |
| 2008/0248875 | A1 | 10/2008 | Beatty |
| 2008/0252011 | A1 | 10/2008 | Bickley et al. |
| 2009/0100409 | A1 | 4/2009 | Toneguzzo |
| 2009/0121434 | A1 | 5/2009 | Baerlocher et al. |
| 2009/0124385 | A1 | 5/2009 | Cuddy |
| 2009/0156310 | A1 | 6/2009 | Fargo |
| 2009/0298577 | A1 | 12/2009 | Gagner et al. |
| 2009/0302540 | A1 | 12/2009 | Snow et al. |
| 2009/0315264 | A1 | 12/2009 | Snow et al. |
| 2010/0016050 | A1 | 1/2010 | Snow et al. |
| 2010/0048304 | A1 | 2/2010 | Boesen |
| 2010/0069155 | A1 | 3/2010 | Schwartz et al. |
| 2010/0105460 | A1 | 4/2010 | Makhoul et al. |
| 2010/0178987 | A1 | 7/2010 | Pacey |
| 2010/0197410 | A1 | 8/2010 | Leen et al. |
| 2010/0234110 | A1 | 9/2010 | Clarkson |
| 2010/0240440 | A1 | 9/2010 | Szrek et al. |
| 2010/0255899 | A1 | 10/2010 | Paulsen |
| 2011/0074107 | A1 | 3/2011 | Rowe |
| 2011/0105208 | A1 | 5/2011 | Bickley |
| 2011/0130190 | A1 | 6/2011 | Hamman et al. |
| 2011/0159952 | A1 | 6/2011 | Kerr |
| 2011/0159953 | A1 | 6/2011 | Kerr |
| 2011/0165936 | A1 | 7/2011 | Kerr |
| 2011/0172008 | A1 | 7/2011 | Alderucci |
| 2011/0183748 | A1 | 7/2011 | Wilson et al. |
| 2011/0230268 | A1 | 9/2011 | Williams |
| 2011/0269529 | A1 | 11/2011 | Baerlocher |
| 2011/0275430 | A1 | 11/2011 | Walker et al. |
| 2011/0287829 | A1 | 11/2011 | Clarkson et al. |
| 2012/0015724 | A1 | 1/2012 | Ocko et al. |
| 2012/0015725 | A1 | 1/2012 | Ocko et al. |
| 2012/0015743 | A1 | 1/2012 | Lam et al. |
| 2012/0015747 | A1 | 1/2012 | Ocko et al. |
| 2012/0021835 | A1 | 1/2012 | Keller et al. |
| 2012/0034977 | A1 | 2/2012 | Kammler |
| 2012/0225706 | A1 | 9/2012 | Yoseloff |
| 2012/0295691 | A1 | 11/2012 | Walker |
| 2013/0053117 | A1 | 2/2013 | Snow |
| 2013/0184059 | A1 | 7/2013 | Costello et al. |
| 2013/0184079 | A1 | 7/2013 | Costello et al. |
| 2013/0296025 | A1 | 11/2013 | Castle, II et al. |

FOREIGN PATENT DOCUMENTS

| | | |
|---|---|---|
| DE | 2830216 | 1/1980 |
| DE | 3003376 | 8/1981 |
| EP | 338644 | 10/1993 |
| GB | 667345 | 2/1952 |
| GB | 2097570 | 4/1982 |
| GB | 2184029 | 6/1987 |
| GB | 94/14822 | 7/1994 |
| GB | 94/26324 | 12/1994 |
| WO | WO 2007/047223 A2 | 4/2007 |
| WO | WO 2008/061001 A2 | 5/2008 |
| WO | WO 2009/061618 A1 | 5/2009 |
| WO | WO 2011/109454 A1 | 9/2011 |

OTHER PUBLICATIONS

U.S. Appl. No. 13/860,991, filed Apr. 11, 2013, Inventors Andrew Costello et al.
U.S. Appl. No. 13/353,194, filed Jan. 18, 2012, Inventors Andrew Costello et al.
U.S. Appl. No. 13/609,031, filed Sep. 10, 2012, Inventors Andrew Costello et al.
U.S. Appl. No. 13/624,743, filed Sep. 21, 2012, Inventors Andrew Costello et al.
U.S. Appl. No. 13/864,069, filed Apr. 16, 2013, Inventors Louis J. Castle et al.
U.S. Appl. No. 13/871,824, filed Apr. 26, 2013, Inventors Louis J. Castle et al.
International Search Report of the International Searching Authority for PCT/US13/22153, dated Apr. 8, 2013, 2 pages.
International Search Report and Written Opinion of the International Searching Authority for PCT/US13/21959, dated May 10, 2013, 7 pages.
International Search Report of the International Searching Authority for PCT/US2013/038688, dated Oct. 10, 2013, 4 pages.
United States Office Action, U.S. Appl. No. 13/631,821, Oct. 29, 2013, 7 pages.
United States Office Action, U.S. Appl. No. 13/631,818, Oct. 29, 2013, 8 pages.
"Over/Under 13 Blackjack" Brochure; Gaming Concepts, Inc. 1988.
"Three-Card Poker," Three-Card Monte, "Brag", Scarne's Encyclopedia of Games, John Scarne, Harper & Row Publishers, p. 28-31, 1973.
Bad Beat Texas Hold 'Em; Rack Card; Shuffle Master, Inc.; 2005.
Card Craps, Scarne's Encyclopedia of Card Games, pp. 321-323, (1948).
Casino Journal, vol. 8, No. 12, Dec, 1992, "Working within the systems: IGT's Linked Progressive Programs Take Leap to the Tables," pp. 10-15, 40, 41.
Copyright filing with the Bureau voor de Intellectuele Eigendom, Aruba, 13 pgs (Jan. 13, 1998).
Flop-A-Lock, 2006 (1 page).
Gibson, W.B. (1974) Hoyle's Modern Encyclopedia of Card Games, pp. 252, 257, 258.
Hoyle's Modern Encyclopedia of Card Games by Walter Gibson, p. 250, 3 pages, 1993.
Information Disclosure Statement Apr. 7, 1988 Describing "Sklansky's Casino Poker" and "Video Poker."
KISS Guide to Gambling by John Marchel, "No-Limit", DK Publishing, Inc., 2001, p. 344.
New Jersey Register (vol. 30, No. 14, Jul. 20, 1998). Rule Adoption, Other Agencies, Cazsino Control Commission, Accounting and Controls, Gaming Equipment, Rules of the Games, Fast Action Hold'Em {pp. 1-15) (Westlaw 30 N.J.R. 2639 (b)). 2005 Thomson/West.
Prime Table Games—Disclosure in Respect to Three Card Games, Derek J. Webb, Feb. 10, 2009.
Published Rule Sheet for Casino Poker from Vegas World, 1 page (1982).
Royer, Victory H., "How to Play Casino Poker—Texas Hold-em", http://www.vegas.com/vegascom/bestbascholdem.
Scarne's Encyclopedia of Card Games, 299-304, 383 (1983).
Scarne's Encyclopedia of Games, Harper & Row, N.Y., Copyright 1973, p. 381, and title pages.
Scarne's Guide to Modern Poker, Constable and Company Limited, 1980, "Brag", pp. 159-160.
Scarne's New Complete Guide to Gambling, 440-45 {1974).
Show Five Cards, Scarne's Encyclopedia of Games, John Scarne, Harper & Row Publishers, pp. 28-29, 1973.
State of New Jersey Casino Control Commission Pm 217205 Civil Action IGT's Second Amended Petition for the Authorization for the Implementation of the Game of Progressive-21 Filed Sometime after Aug. 4, 1991.
Tre Card Stud TM Procedures Manual, Mikohn Gaming, Mar. 7, 2000.
Webb, Derek J., "Three Card Poker Disclosure" (1992).

(56) References Cited

OTHER PUBLICATIONS www.findarticles.com/p/articles/mi_mOEIN/is_2004_July_26/ai_n6122536/print; Mikohn Launches Texas Hold 'Em Bonus Poker Table Game.
www.galaxygaming.com/texasshootout.html; Texas Shootout; 2005 {5 pages).
www.lakesentertainment.com/games.wpt; World Poker Tour; 2005 (6 pages).
www.oldvegaschips.com; Poker Rules & Poker Questions Answered; Texas Hold'em; Omaha High; Deuces Wild Poker; Caribbean Poker; Poker Rules, How to play poker, how to play Texas Hold'em Poker; 42 pages (accessed Mar. 10, 2006).
www.progressivegaming.net/pages/games/texasholdem.html; 2005 (2 pages).
www.riversideresport.com/gaming/live-games Deuces Wild Hold 'Em Fold 'Em, obtained Jan. 16, 2007 {4 pages).

* cited by examiner

METHODS OF PLAYING WAGERING GAMES

CROSS-REFERENCE TO RELATED APPLICATIONS

This application is a continuation-in-part of U.S. patent application Ser. No. 13/631,825, filed Sep. 28, 2012, now U.S. Pat. No. 8,590,900, issued Nov. 26, 2013, which is a continuation-in-part of U.S. patent application Ser. No. 13/399,141, filed Feb. 17, 2012, pending, which is a continuation of U.S. patent application Ser. No. 11/108,159, filed Apr. 15, 2005, abandoned, which is a continuation-in-part of U.S. patent application Ser. No. 10/938,483, filed on Sep. 10, 2004, now U.S. Pat. No. 7,264,243, issued Sep. 4, 2007, the entire disclosure of each of which is hereby incorporated herein by this reference.

TECHNICAL FIELD

The present invention relates to wagering games, particularly wagering games using playing cards or images of playing cards, and wagering games played on casino tables, video machines, multi-player platforms or the Internet.

BACKGROUND

Many different wagering games presently exist for use in both home and casino environments. Such games should necessarily be exciting, uncomplicated and easy to learn so as to avoid frustrating the players. Designing new games that meet these criteria and are sufficiently different from old games to entice players to play the new game is particularly challenging.

BRIEF SUMMARY

A card game is played against a pay table, wherein the player receives a partial hand that is preferably completed by community cards (but may be completed by cards dealt directly to a hand or a combination of cards dealt directly to a hand and at least one community card or wild card). After placement of an ante wager, each player will have an opportunity to place a game or “play” wager before receiving another card for the player’s hand (whether dealt directly to the player or as a community card revealed to all players). At least some or all game wagers may be an amount within a range of multiples of the player (such as one times, two times, three times, four times, or five times the amount of the ante wager). The range of wagers may remain the same or vary with the number of dealt cards or community cards revealed to the players.

Further embodiments may include one, some, or all of the following: The acts of the dealer may be carried out by a visual representation of a dealer, the visual representation being generated and/or displayed by a computer. The visual representation may be a virtual person (e.g., an animation), or may be a transmission (e.g., a video) of an actual person. The visual representation may be part of an online gaming experience of the disclosed game. The acts described in this disclosure associated with a dealer, including dealing cards, displaying or turning cards over, receiving or paying bets, or any other actions, may be represented in any way when used in an online environment. For example, the cards associated with a dealer action, described as being dealt or otherwise handled by a dealer, may appear as virtual cards or as transmitted pictures of physical cards. This may include a display of virtual card decks where each deck, individual card, and hand is displayed to an online player in a manner consistent with the game play disclosed herein, but may or may not include a visual representation of a dealer with the cards. Likewise, betting activity may be displayed in any manner to a player including, but not limited to, virtual chips, betting pools, numbers, or other indicia of a bet amount.

The online experience may involve players playing remotely (e.g., in a different physical location) from the dealer (such as a live dealer dealing cards on a table in a remote studio), the location of a game server, or both, interacting through a networked connection that may include, but is not limited to, the Internet. The online game play may involve players who are also physically remote from each other. Remote connections may use networks involving several types of network links including, but not limited to, the Internet. Networked connections allowing physically remote players to play a game using a game server or system may be part of an implementation of a virtual or online gaming environment.

The actions described in this disclosure as the acts of a player, including betting, card selection (if any), card discards (if any), or any other actions, may be carried out over a network where the indicated actions are received as input to a device. In a live gaming environment, player elections are received by a dealer by means of verbal communication, or by means of a signal such as the placement of cards or chips in a particular location on the layout or signaling with a hand motion, for example. In computer implemented forms of the invention, the input-receiving device may be physically remote from the game server or game host and connected over a long-distance network, but may also be implemented over a wired or wireless LAN in one building, or even in one room, for example. In one embodiment, game play generated at the server or host location may be displayed on the same device as the receiving device. In some embodiments, game play may be conveyed to remote players in devices separate from the devices receiving input from a player, such as public screens or publicly broadcast data about a game coupled with individual or private input devices. The reception of an input at a device may be accomplished through any technology adapted for such a purpose including, but not limited to, keypads, keyboards, touchpads, mice, optical location devices, eye movement/location detectors, sound input devices, joy sticks, toggle switches, finger swipes, etc. When discussing a device, it is understood the device may comprise multiple components and be complex; including hardware components combined with filmware and/or software, and may itself be a subcomponent of a larger system.

Yet other embodiments may comprise apparatuses and systems for administering wagering games according to embodiments of the disclosure.

BRIEF DESCRIPTION OF THE DRAWINGS

While the disclosure concludes with claims particularly pointing out and distinctly claiming embodiments within the scope of the disclosure, various features and advantages of embodiments encompassed by the disclosure may be more readily ascertained from the following description when read in conjunction with the accompanying drawings, in which:

DETAILED DESCRIPTION

The illustrations presented herein are not meant to be actual views of any particular act in a method of administering a wagering game, apparatus for use in administering a wagering game, or component thereof, but are merely idealized representations employed to describe illustrative embodiments. Thus, the drawings are not necessarily to scale. Additionally, elements common between figures may retain the same or similar numerical designation. Elements with the same number, but including a different alphabet character as a suffix should be considered as multiple instantiations of substantially similar elements and may be referred generically without an alphabet character suffix. For example, elements 100*a*, 100*b*, 100*c*, may be a device that is instantiated three times and referred to generically as element 100.

The terms "gaming," "gambling," or the like, refer to activities, games, sessions, rounds, hands, rolls, operations, and other events related to wagering games such as web-based games, casino games, card games, dice games, and other games whose outcome is at least partially based on one or more random events ("chance" or "chances"), and on which wagers may be placed by a player. In addition, the words "wager," "bet," "bid," or the like, refer to any type of wagers, bets or gaming ventures that are placed on random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games that are "play for pay" as well as "play for fun," as will be described in more detail below.

There are at least some generic elements and combinations of elements of play within the scope of the game and technology disclosed. A card game is played only against a pay table. In other embodiments, additional side bets against a dealer hand are played simultaneously with the game against a pay table, as described below. The pay table may be against only a final hand (e.g., best five-card hand out of five, six or seven cards), or may be against intermediate hands as well as the final hand (as disclosed in U.S. Pat. Nos. 5,988,643; 6,206,780; 6,705,943; and U.S. patent application Ser. No. 09/815,181, filed Mar. 22, 2001, now U.S. Pat. No. 7,175,522, issued Feb. 13, 2007; U.S. patent application Ser. No. 10/602,015, filed Jun. 23, 2003, now U.S. Pat. No. 7,246,799, issued Jul. 24, 2007; and U.S. patent application Ser. No. 10/646,670, filed Aug. 22, 2003, now U.S. Pat. No. 6,986,514, issued Jan. 17, 2006), the disclosure of each of which is hereby incorporated by reference in their entirety.

Figure 1:
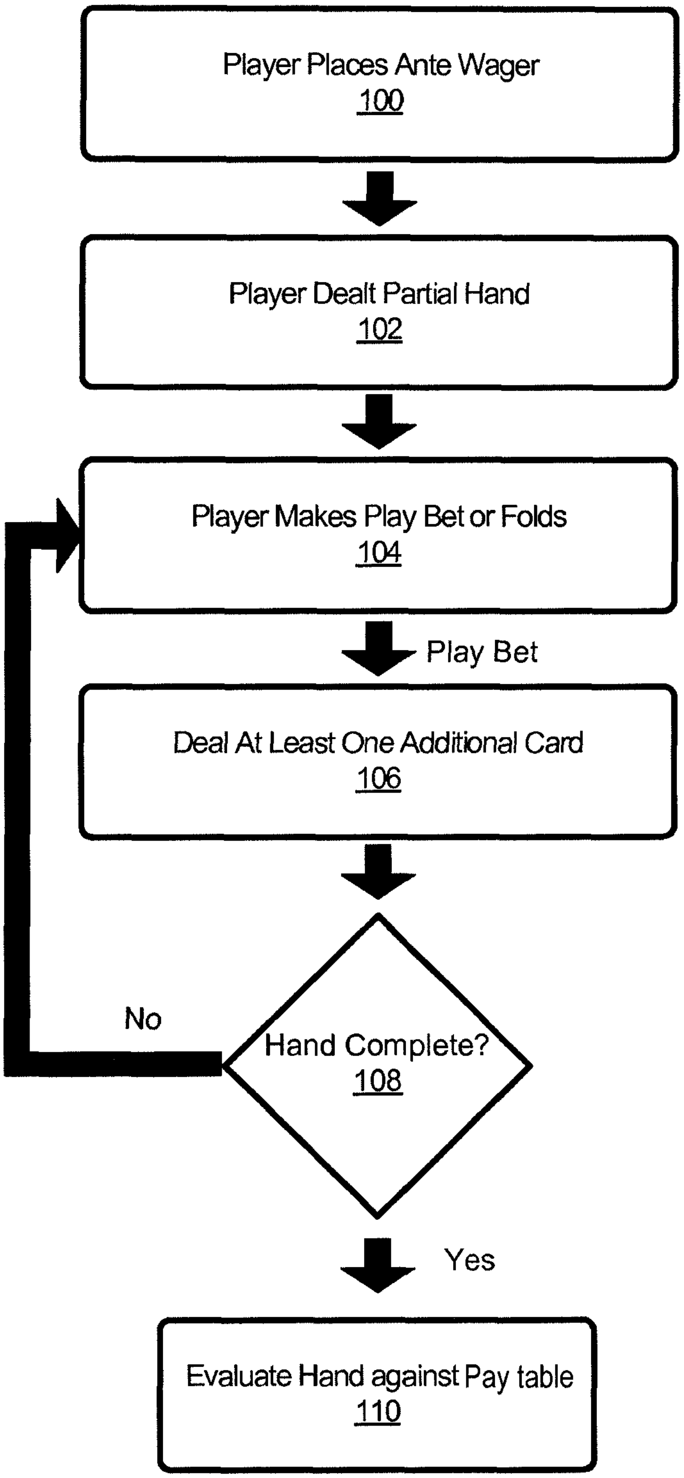
FIG. 1 is a flowchart diagram of a method of administering a wagering game.

Referring to FIG. 1, a flowchart diagram of a method of administering a wagering game is shown. In game play, according to various embodiments, the players place at least an ante wager (e.g., bonus side bets against a dealer hand and/or jackpot wagers may be separately placed, but need not be compulsory) and receive a partial hand. A "partial hand" means that in the play of the game, additional cards are available or necessary to complete a final hand in the game. The partial hand is completed in certain games by community cards, but may be completed in other games by additional cards dealt directly to a hand, dealer cards, randomly generated virtual cards, additional bonus cards or a combination of cards dealt directly to a hand and at least one community card or wild card. Community cards are cards dealt and displayed on the table that are used by all players in the construction of intermediate and final hands.

In one embodiment of the wagering game, to initiate play of the game, a dealer or a gaming system receives a wager or an indication of a wager from the player 100. The player is next dealt 102 a partial hand by the dealer or a gaming system. In one embodiment, a final hand may be completed by the player using two cards dealt to the player and a group of community cards. In this embodiment, the partial hand is the two cards dealt to the player. To continue in the hand, the dealer or gaming system receives a play election from the player in the form of a play bet or a fold 104. The play bet may be equal to the ante bet, or may be a multiple of the ante bet. If the dealer receives a fold election and the player folds, the player forfeits the player's ante wager and any play bets that have been made. In this embodiment, additional play bets are made by the player prior to additional cards being revealed. After the dealer receives the player's play bet, at least one additional card is dealt 106, either directly to a player's hand or at least one dealt community card is revealed. The at least one additional card may complete the cards to be dealt, or may form an intermediate hand. If the hand is not yet complete 108 (i.e., this is an intermediate hand and there are additional cards to deal in the round), the dealer receives another play election chosen from another play wager or a fold election at operation 104. In one embodiment, the dealer accepts three player play elections that include a play or fold election prior to the hand being completed. That is, in this embodiment the player makes three play bets prior to completing the player's hand. In one embodiment, the dealer deals at least one community card to a community card position on the layout at the same time the dealer deals the player partial hands at operation 102. When common cards are dealt at the same time as operation 102, they may be dealt face down, and the step of dealing at least one additional card 106 includes the dealer revealing at least one community card. In some embodiments, during one or more of the player game play elections, the dealer may receive a check election rather than a fold election. When the player's hand is complete 108, the player's hand is evaluated 110 against a pay table to determine the result of the round. If the hand qualifies as a winning arrangement of cards and is listed on the pay table, the player's ante and play wagers are paid based on a payout associated with the hand ranking on the pay table. When the player's hand is not listed on the pay table, the player's ante and play wagers are lost. This is one method of playing the game according to one embodiment. Additional methods and variations of playing a wagering game are further described below.

In one embodiment, after placement of an ante wager and review of only their initial partial hands, each player will have an opportunity to place a first game or "play" wager before receiving another card for the player's hand (whether dealt directly to the player, assigned as a community card revealed to all players or assigned otherwise such as by random display of a virtual card). At least some or all game wagers (including the first game wager) may be an amount within a range of multiples that may be chosen from the range by the player (such as within a range of one times, two times, three times, four times, or five times or higher times or fractional times the amount of the ante wager). It is possible in some forms of the game to allow the player to pass or "check," making no additional wager and yet remain in the game. The range of wagers may remain the same or vary with the number of dealt cards or community cards revealed to the players. For example, the first play wager may be any of one times to five times, or only one times to two times, and a second play wager (later discussed) may be limited to the size of the first play wager actually made, or may again be one times to five times, only one times to two times, or only one times or two times, according to the house rules.

One series of play elements in the game described herein could be practiced as follows. A method of playing a casino table card game against a pay table comprises a player placing a first ante wager to play the card game against the pay table. In one example of the game, five-card poker rankings are used as the basis of constructing the pay table. The player receives an initial partial player's hand of cards, which the player views. Ordinarily, the initial partial hand of cards comprises enough cards to give the player some basis for evaluating the potential quality of the final player's hand. The player reviews the initial partial player's hand and makes an election to fold, to stay (e.g., a "check") with no additional wager, or to place an additional wager (either a compulsory wager or an optional wager) before seeing any additional cards used to complete the initial partial player's hand. The player, after executing his decision, then views at least one first additional card from a set of additional cards to only partially complete the initial partial player's hand, forming a second partial player's hand. As additional cards are added, provided the player remains in the game, the player may form incremental partial hands until a final hand for the player is determined.

An additional play wager, before seeing the first additional card, is selected by the player from a range of amounts, such as one, two, or three times the ante wager. The method would then allow viewing the at least one first additional card as viewing a first additional player card or a first community card. After placing the additional play wager and viewing the first community card, the player makes a second election to fold, to stay with no additional wager, or to place a second additional wager before seeing any second additional card used to complete or partially complete the second initial partial player's hand. The second additional wager is again selected by the player from a range of amounts such as one, two, or three times the ante wager, although as indicated above, different ranges or limits may be imposed based upon other events or other rules, but there should still be an optional range available to the player. In this embodiment, viewing at least one second additional card comprises viewing a second community card. After placing the second additional wager and viewing the second community card, the player makes a third election to fold, to stay with no additional wager, or to place a third additional wager before seeing any third additional card used to complete the initial partial player's hand. The third additional wager is again selected by the player from a range of amounts, for example, comprising one times, two times, and three times the ante wager.

The game in this example game is played with two initial cards in the players' initial partial hands. In various embodiments, there may then be three, four, or five community cards, with three community cards being the number of cards in this example (as four and five cards would allow for a very high rank hand to be completed with one or two wagers still remaining, forming a five-card poker hand). The cards may be revealed one at a time or multiple cards at a time (especially with four or five community cards) to control the number of play wagers that may be available in the game. For example, with three community cards, there could be three play wagers when cards are revealed one card at a time, or two play wagers when a single card is revealed before one play wager (e.g., before the first or second play wager) and two cards are revealed before another play wager (e.g., before the second or first play wager, respectively). After the hand is complete (assuming that the player has placed all wagers necessary to remain in the game until conclusion of the disclosure of all community cards), all wagers are resolved against at least one pay table. There may be a single pay table for all wagers, or different pay tables for each wager. The ante wager may be paid at 1:1 if the player remains in the game until the revelation of the community cards is complete, or if the player attains at least a minimum hand (which may be less than the minimum hand on a typical pay table, such as an A-K), or may be paid at the pay table rate as are the other wagers.

An example of a pay table with two initial cards and three community cards revealed one at a time could be as follows:

PAY TABLE I

| FINAL HAND | PAYOUT ODDS |
|---|---|
| ROYAL FLUSH | 100:1 |
| STRAIGHT FLUSH | 50:1 |
| FOUR OF A KIND | 12:1 |
| FULL HOUSE | 7:1 |
| FLUSH | 5:1 |
| STRAIGHT | 4:1 |
| THREE OF A KIND | 3:1 |
| TWO PAIR | 2:1 |
| PAIR OF SIXES OR BETTER | 1:1 |

Another example of a pay table for the ante wager and the play wagers, with two initial player cards and three community cards revealed, first one card and then both cards could be:

PAY TABLE II

| FINAL HAND | PAYOUT ODDS |
|---|---|
| ROYAL FLUSH | 150:1 |
| STRAIGHT FLUSH | 70:1 |
| FOUR OF A KIND | 15:1 |
| FULL HOUSE | 8:1 |
| FLUSH | 5:1 |
| STRAIGHT | 4:1 |
| THREE OF A KIND | 3:1 |
| TWO PAIR | 2:1 |
| PAIR OF SIXES OR BETTER | 1:1 |

In addition to these pay tables, as noted before, the payout for the ante wager may be different than for the remaining wagers. In addition, there may be an automatic ante bonus payout (one time or two times) for any initial pair in the first two cards.

The following example will show the steps of example game play according to an embodiment.

A game played according to the following teachings herein is referred to as MISSISSIPPI STUD® poker, which is a casino table card game that can also be played on a video system, a home computer, on a multiplayer platform gaming system, as a hand-held practice game, or as a game offered on the Internet. The Internet-based game may display virtual dealer cards, or may provide a pre-recorded or live video feed of a dealer dealing cards on a table from a remote studio or casino location. The game is played against a pay table, with specific rules and game play elements. There is no player versus dealer competition in this embodiment. In the MISSISSIPPI STUD® game, after placing an ante wager, each player is provided two initial cards from the dealer. The players may stay in the game by viewing the initial two cards and then electing to place a bet of 1, 2, or 3 times the ante, or the player may elect to fold. Players must place a play bet to continue the hand. One community card, called the "third street" card is revealed. To continue, a player must elect to place a second play bet of 1, 2, or 3 times the ante, or the player may elect to fold. A second community card or "fourth street" card is revealed. To continue, a player must elect to place a third play bet of 1, 2, or 3 times the ante, or the player may elect to fold. A third community card, called the "fifth street" card is revealed. The player's hand is determined by combining the player's two cards with the three community cards and evaluated based on five-card poker rankings to determine a hand ranking. The player's payouts are paid based on the pay table for the game. Thus, each time a new card is provided to the player, the player may bet 1×-3× the player's ante wager to continue or the player may fold.

Example 1

There are four players at a gaming table. Each player places an initial ante wager of $10, $10, $25, and $50, respectively, and the following initial two card hands are dealt to each player, with their initial decisions on play wagers shown beneath the hands. In Example 1, the players may make play bets up to three times the ante, according to house rules. The three (3) community cards may be dealt at this time, face down.

| Player 1 $10 | Player 2 $10 | Player 3 $25 | Player 4 $50 |
|---|---|---|---|
| 10♠ 10♥<br>$30 (3×) | 6♣ 4♠<br>Fold, no play wager | J♦ Q♦<br>$50 (2×) | A♥ 9♣<br>$50 (1×) |

Player 1 will make the maximum wager, as his hand is a guaranteed win on all wagers.

Player 2 will fold, as there is an extremely low likelihood of the hand being improved.

Player 3 has a good working hand, with two high cards, in suit, and a base for a straight. Player 3 places an intermediate "play" wager of two times the ante.

Player 4 has a decent working hand, with two cards above the minimum pairs needed for a win. Player 4 chooses to make a play wager that is one times the ante.

After all of these wagers have been made (and without yet resolving the automatic win for player 1), the first community card is dealt, and it is a K♦. The hands of the players and their next wagers are shown in the following table:

| Player 1<br>$10 + $10 | Player 2 $10 | Player 3<br>$25 + $50 | Player 4<br>$25 + $25 |
|---|---|---|---|
| 10♠ 10♥<br>K♦<br>$30 (3×) | Folded | J♦ Q♦<br>K♦<br>$75 (3×) | A♥ K♦<br>9♣<br>$25 (1×) |

Player 1 will make the maximum wager, as his hand is a guaranteed win on all wagers.

Player 2 has folded.

Player 3 has a good working hand, with three high cards, in suit, and a base for a straight, a flush, a straight flush or a royal flush, as well as a high pair. Player 3 chooses a play bet that is three times the ante.

Player 4 still has a decent working hand, with three cards above the minimum pairs needed for a win, but no winning hand yet. Player 4 makes a play wager of one times the ante.

After all of these wagers have been made (and without yet resolving the automatic win for player 1), the second community card is dealt, and it is a 10♦. The hands of the players and their next wagers are shown in the following table.

| Player 1 $70 | Player 2 $10 | Player 3 $150 | Player 4 $75 |
|---|---|---|---|
| 10♦ 10♠ 10♥ K♦<br>$30 (3X) | Folded | 10♦ J♦ Q♦ K♦<br>$75 (3X) | A♥ K♦ 10♦ 9♣<br>$50 (1X) |

Player 1 will make the maximum wager, as his hand is a guaranteed win on all wagers.

Player 2 has folded.

Player 3 has an excellent working hand, with four high cards, in suit, and a base for a straight, a flush, a straight flush or a royal flush, as well as a high pair. Player 3 wagers three times the ante, hoping for a very big payout.

Player 4 still has a decent working hand, with four cards above the minimum pairs needed for a win, but no winning hand yet. He bets one times the ante.

After all of these wagers have been made (and without yet resolving the automatic win for player 1), the third community card is dealt, and it is a Q♥. The hands of the players and their next awards are shown in the following table.

| Player 1 $100 Bet | Player 2 $10 | Player 3 $225 | Player 4 $125 |
|---|---|---|---|
| 10♦ 10♠10♥<br>K♦ Q♥<br>$300 (3X) Won | Folded | 10♦ J♦ Q♦<br>K♦ Q♥<br>$225 (1X) Won | A♥ K♦ 10♦<br>9♣ Q♥<br>$0 All Bets Lost |

As can be seen, Player 1 has won three times each of his wagers (in an amount of $100) with three of a kind; Player 2 lost his initial ante wager of $10; Player 3 still won $225, even though the potential very high hand was not achieved; and Player 4 lost $125, as the hand did not end up with a pair of 6s or higher. The three times multiple was taken from Pay Table I above.

Example 2

An optional format is for there to be two community cards and either a wild card (the presence of which would necessitate a change in the pay table to lower payouts) or an individual additional card dealt to each hand. In this form of the game, the player can bet up to three times the ante.

The game will otherwise be played similarly, using much the same beginning cards as in Example 1. There are four players at a gaming table. Each player places an initial ante wager of $10, $10, $25, and $50, respectively, and the following initial two-card hands are dealt to each player, with their initial decisions on play wagers shown beneath the hands. The two (2) community cards may be dealt at this time, face down, and the final card for each is retained in the dealing shoe or shuffler, to be delivered after the two community cards are exposed.

| Player 1 $10 | Player 2 $10 | Player 3 $25 | Player 4 $50 |
|---|---|---|---|
| 10♠ 10♥<br>$30 (3X) | 6♣4♠<br>Fold, no play wager | J♦ Q♦<br>$50 (2X) | A♥ 9♣<br>$50 (1X) |

Player 1 will make the maximum wager, as his hand is a guaranteed win on all wagers.

Player 2 will fold, as there is an extremely low likelihood of the hand being improved.

Player 3 has a good working hand, with two high cards, in suit, and a base for a straight.

Player 4 has a decent working hand, with two cards above the minimum pairs needed for a win.

After all of these wagers have been made (and without yet resolving the automatic win for player 1), a first community card is dealt, and it is a K♦. The hands of the players and their next wagers are shown in the following table.

| Player 1 $10 + $10 | Player 2 $10 | Player 3 $25 + $50 | Player 4 $25 + $25 |
|---|---|---|---|
| 10♠ 10♥ K♦<br>$30 (3X) | Folded | J♦ Q♦ K♦<br>$75 (3X) | A♥ K♦ 9♣<br>$25 (1X) |

Player 1 will make the maximum wager, as his hand is a guaranteed win on all wagers.

Player 2 has folded.

Player 3 has a good working hand, with three high cards, in suit, and a base for a straight, a flush, a straight flush or a royal flush, as well as a high pair.

Player 4 still has a decent working hand, with three cards above the minimum pairs needed for a win, but no winning hand yet.

After all of these wagers have been made (and without yet resolving the automatic win for player 1), a second community card is dealt, and it is a 10♦. The hands of the players and their next wagers are shown in the following table.

| Player 1 $70 | Player 2 $10 | Player 3 $150 | Player 4 $75 |
|---|---|---|---|
| 10♦ 10♠ 10♥ K♦<br>$30 (3X) | Folded | 10♦ J♦ Q♦ K♦<br>$75 (7X) | A♥ K♦ 10♦ 9♣<br>$50 (1X) |

Player 1 will make a maximum wager equal to three times the ante, as his hand is a guaranteed win on all wagers.

Player 2 has folded.

Player 3 has an excellent working hand, with four high cards, in suit, and a base for a straight, a flush, a straight flush or a royal flush, as well as a high pair.

Player 4 still has a decent working hand, with four cards above the minimum pairs needed for a win, but no winning hand yet.

After all of these wagers have been made (and without yet resolving the automatic win for player 1), the third additional card is dealt to each player's hand, and the individual cards are shown below in the table. The hands of the players and their next awards are shown in the following table.

| Player 1 $100 Bet | Player 2 $10 | Player 3 $225 Bet | Player 4 $125 Bet |
|---|---|---|---|
| 10♦ 10♠ 10♥<br>K♦ 6♥<br>$300 (3X) Won | Folded | 10♦ J♦ Q♦<br>K♦ 9♦<br>$11,250 (50X) Won | A♥ K♦ 10♦<br>9♣ Q♥<br>$0 All Bets Lost |

As can be seen, Player 1 has won three times each of his wagers with three of a kind; Player 2 lost his initial ante wager of $10; Player 3 has won $11,250, with a straight flush achieved; and Player 4 lost $125, as the hand did not end up with a pair of sixes or higher.

If a wild card were present in the deck, either as a potential community card or as an individual card, the pay tables would have to be significantly altered to accommodate the likelihood of more winning hands and higher winning hands. For example, in the above case, if the third additional card had been a wild card, Player 1 would have had a four of a kind, Player 3 would have had a royal flush, and Player 4 would have had a pair of aces.

One specific mode of play of a game within the concepts described herein includes events where after placing an ante wager, the players receive two cards face down (which they may view) and then three community cards are dealt face down. The players may view their hands to decide the likelihood of success of their hand against the pay table, and may fold or place a wager of from one time to three times the amount of the ante wager. After all players at the table have acted on their individual decisions, a first and second of the three community cards is revealed. The players then analyze their hands in combination with the revealed first and second community cards, and may again fold or place a wager of from one times to three times the amount of the ante wager. After all players at the table have acted on their individual decisions, a third of the three community cards are revealed. The players then analyze their hands in combination with the three revealed community cards, and may again fold or place a wager of from one times to three times the amount of the ante wager. After all players at the table have acted on their individual decisions, the third of the three community cards is revealed. This offers the opportunity on certain of the wagers to make wagers on hands that are known to be winning events. It also offers an opportunity for as much as an additional seven times the ante to be wagered during the course of the game (one times+three times+three times).

Various platforms are contemplated that are suitable for implementation of embodiments of wagering games according to the present disclosure. For example, embodiments of wagering games may be implemented such that one or more players may place wagers and engage in game play according to the rules of the wagering games. For example, wagering games may be implemented on gaming tables, which may include physical gaming features, such as physical cards, physical chips, and may include a live dealer and a shuffler or shoe. More specifically, a live dealer may deal physical cards, accept wagers, issue payouts, and perform other administrative functions of game play, including accepting player game play elections. Some embodiments may be implemented on electronic devices enabling electronic gaming features, such as providing electronic displays for display of virtual cards, virtual chips, game instructions, pay tables, etc. Some embodiments may include features that are a combination of physical and electronic features.

As an example, embodiments of wagering games may be implemented on an individual gaming device for accepting wagers that has a display screen and input devices for enabling game play of the wagering games. Such an individual gaming device may be linked with other gaming devices that may be operated, for example, by other players. Some individual electronic gaming devices may be referred to as an individual player "cabinet" or "terminal" and may be stationary, such as being located on a casino floor. Other individual electronic gaming devices may be portable devices that may be carried to different locations by the player. Portable devices may include both display of the ongoing game play and input reception for game play by a player, and may be configured for receiving input from a player while the game play is displayed on a public monitor, or other display device. Game play and game outcomes may also be displayed on a portable device.

As previously noted, the present games and rules may be played as a live casino table card game, as a hybrid casino table card game (with virtual cards or virtual chips), on a multi-player electronic platform (as disclosed in U.S. patent application Ser. Nos. 10/764,827; 10/764,994, now U.S. Pat. No. 7,661,676, issued Feb. 16, 2010, and Ser. No. 10/764,995, now U.S. Pat. No. 8,272,958, issued Sep. 25, 2012, all filed on Jan. 26, 2004, the disclosure of each of which is incorporated herein in its entirety by this reference), on a personal computer for practice, on a hand-held game for practice or on a legally authorized site on the Internet.

In one embodiment, the players are remotely located from a live dealer and the players observe a live dealer via an electronic camera trained on the dealer and on a game table. Players are able to observe the live dealer on their monitors via a live or prerecorded video feed. In some embodiments, a camera may also be trained on a player, and the players' video feeds may be transmitted to the dealer and also be shared among the players at the table.

In a sample embodiment, a central station includes a plurality of betting-type game devices, and an electronic camera trained on a dealer. A plurality of player stations are remotely located with respect to the central stations, each of the plurality of player stations including a monitor for displaying a selected game device at the central station, and input means for selecting a game device (such as a live table game operated at a remote location by a live dealer in a studio or remote casino) and for placing a bet by a player at the player's station relating to an action involving an element of chance to occur at the selected game device. Further details on gambling systems and methods for remotely located players are disclosed in U.S. Pat. No. 6,755,741 B1, issued Jun. 29, 2004, and titled "Gambling Game System and Method for Remotely-Located Players," the disclosure of which is incorporated herein in its entirety by this reference, and in connection with FIGS. 8 and 9.

Figure 2:
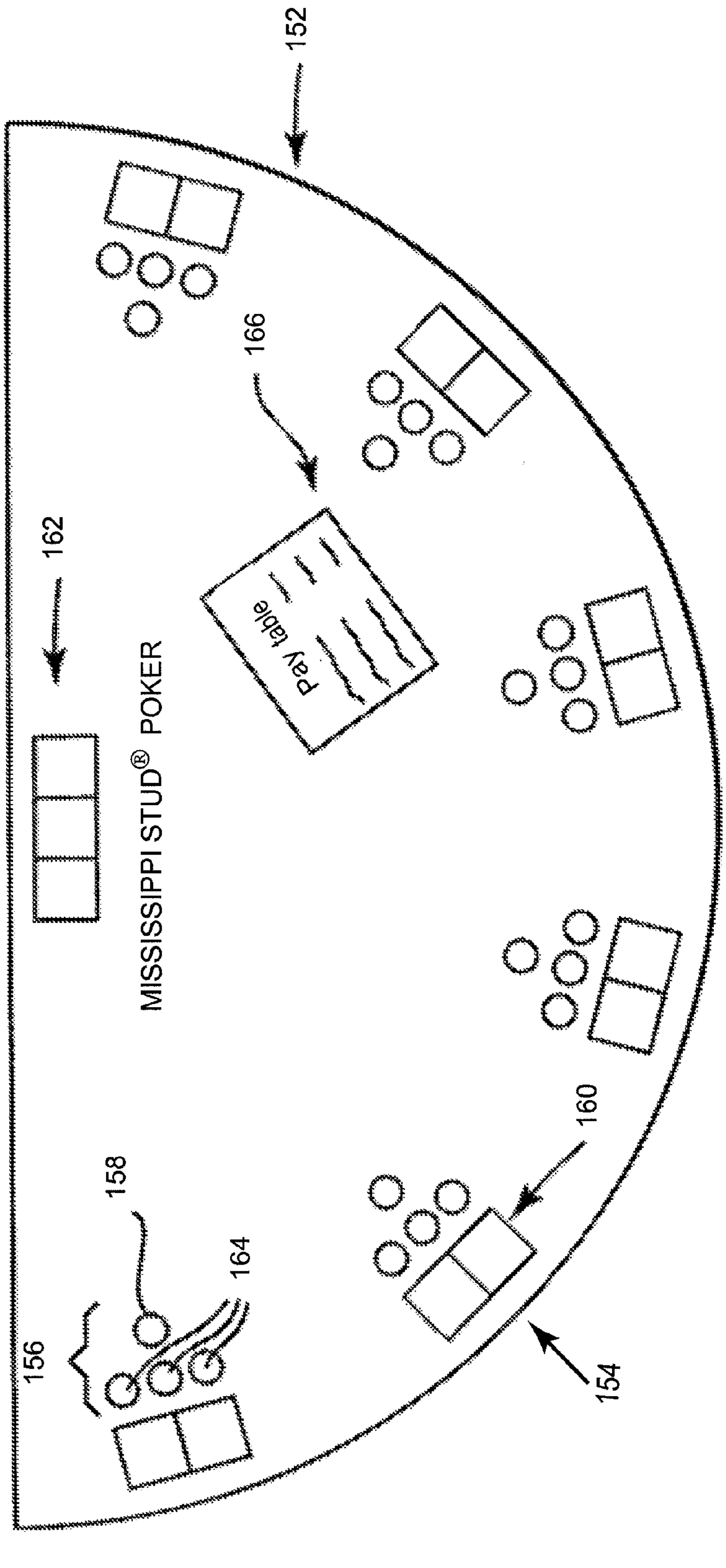
FIG. 2 is a diagram of a playing surface for implementation of the wagering game.

Referring to FIG. 2, a diagram of a playing surface for implementation of the wagering games within the scope of the present disclosure is shown. For purposes of this disclosure, a dealer-administered gaming table with a dealer station, a camera trained on the dealer station, multiple player positions and at least one display for displaying player elections is an exemplary game device. A table layout 152 is shown with an example of six player positions 154, with each player position 154 having a set of wager positions 156 comprising at least an ante wager position 158 and three play bet wager positions 164. Each player position 154 has at least a card receiving area 160 and the dealer position has a community card receiving area 162. Rules of the game and payout tables are shown as an optional area 166. According to the games described above, a player at a player position 154 initially places a wager in the ante wager position 158. Before or after placing the ante wager, the dealer provides cards to the player in card receiving area 162, face down. The player is permitted by the dealer to view the player cards, and makes a first game play election to determine whether to place a first play wager in one of the play bet wager positions 164 or to fold. When community cards are dealt, the community cards are placed at community card receiving area 162, face down at the same time the player cards are dealt to the player card receiving areas 160. In other embodiments, the community cards can be dealt at the time the cards are revealed by the rules of the game.

Figure 3:
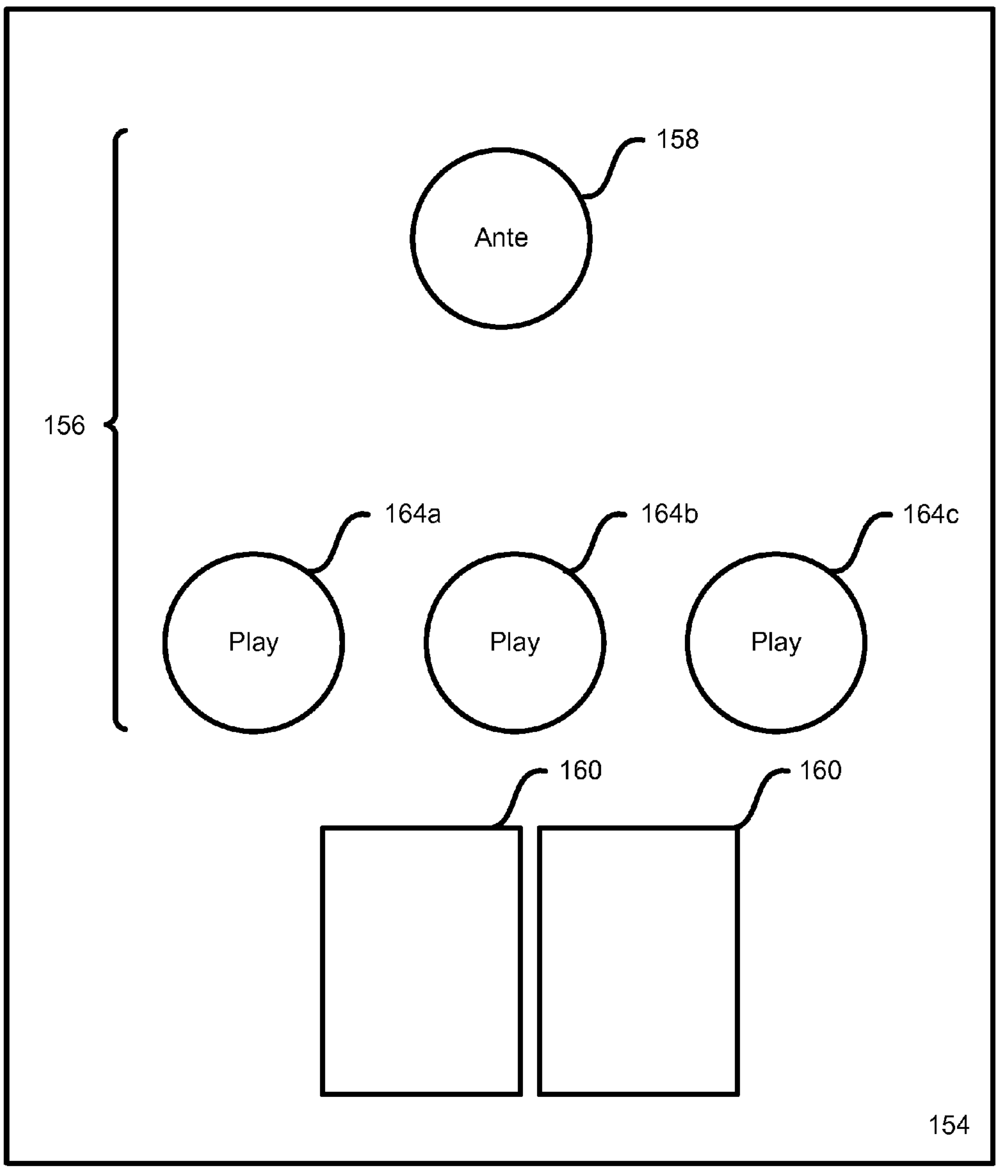
FIG. 3 is an enlarged diagram of one of the player positions of the playing surface of FIG. 2.

Referring to FIG. 3, an enlarged diagram of one of the player positions 154 of the playing surface of FIG. 2 is shown. A designation of a player position 154 may include a designated frame around the player position 154, as shown in FIG. 3, or may be implied by placement of the wagering areas 156 as shown in FIG. 2. Likewise, the card receiving area 160 may be marked on the table or may not be marked. When a player makes play wagers, the play wagers may be placed from left to right in the play bet wager positions 164. Specifically, a first play wager is placed at play wager position 164*a*, a second play wager at play wager position 164*b*, and a third play wager at play wager position 164*c*. Where more or fewer play wagers are used in a particular embodiment, more or fewer play wager positions may be used. In games where the play wager at each play wager opportunity varies, for example, from the first to the second play wager, or second to third play wager, the separate play wager locations may assist in explicitly indicating which play wager is being placed and the associated amounts available to play at that location.

In some embodiments, the wagering games described herein may be played against the house (i.e., be "house-banked"), which may involve playing against a dealer hand or a pay table, with payouts on wagers being paid by a casino or other gaming establishment and losses on wagers being collected by the casino or other gaming establishment. For example, the ante and play wagers are house banked in one embodiment, such that wins and losses from the player hands are paid from a house account. When a player's hand is paid based on the pay table, the players are paid by the house in this embodiment.

In other embodiments, the wagering games, or at least one wager associated with the wagering game, may enable players to play against one another (i.e., be "player-banked" or "player-pooled"), with payouts on wagers being paid from a pot and losses on wagers being collected by other players. Player-banked games allow a player or a professional banker to take all other player losses and pay payouts to players. In a player-banked version of a game of the present disclosure, a house may provide a dealer to administer the game, and may rake wagers made, payouts won, or charge a flat fee for playing the game. Player-banked games are typically offered as live table games in card rooms where house-banking gaming is not permitted by local gaming regulations. Player-pooled variants of games may be offered as live table games, but are more typically offered in electronic format, where tracking the value of a jackpot pool is conducted using computer-controlled equipment. Player-pooled variants are particularly useful when regulators of online casino play permit the play of "poker."

Figure 4:
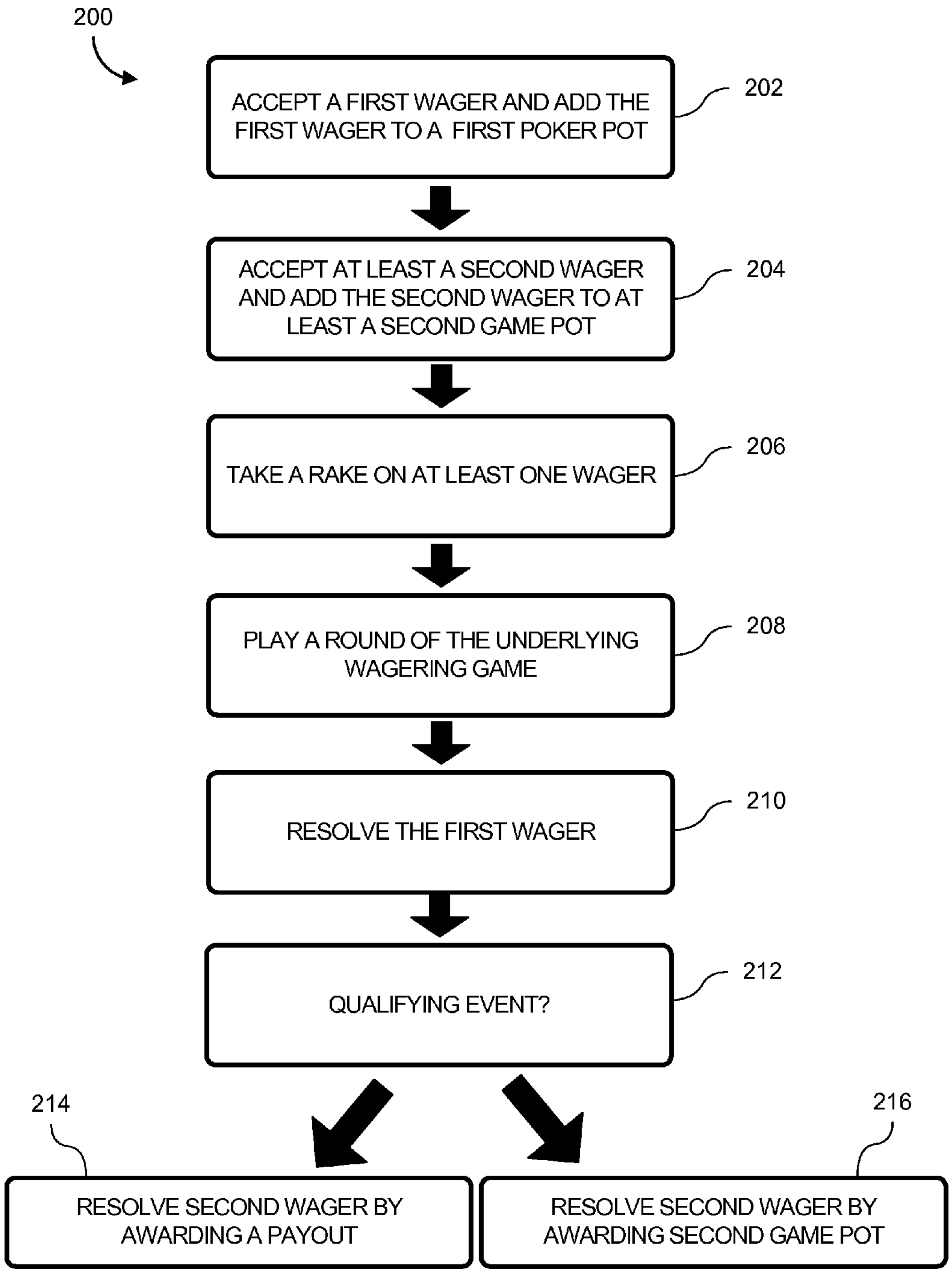
FIG. 4 is a flowchart diagram of a method of administering a wagering game that may be at least partially player-pooled.

Referring to FIG. 4, a flowchart diagram of a method 200 of administering a wagering game, which may be at least partially player-pooled, is shown. The method 200 includes accepting a first "poker" wager from a player and adding the first wager to a first poker pot (e.g., a pool or accumulation of bets), as indicated at operation 202. The wagers contributed to the poker pool may be raked in one example of the invention.

A second wager may be received at operation 204. The second wager may comprise, for example, a base game wager (e.g., antes, blinds, play bets, raises, and other bets made on the underlying wagering game) or a side wager. Second wagers may be raked. Alternatively, payouts on second wagers may be raked. More specifically, the second wager may comprise, for example, the ante wager and any of the play wagers, or a separate pay table or progressive side wager. The second wager may be accepted, for example, by performing any of the acts described previously in connection with FIG. 1. In one example, the second wager may comprise all wagers made in the game of MISSISSIPPI STUD®, and the first wager may be an additional "poker" wager. The first poker pot may be non-progressive, meaning that the entire value of the pot is distributed to a player at the conclusion of a round of play. If two players tie with a highest ranking hand, the poker pot may be split. In other embodiments, the player holding the highest ranking hand is awarded a percentage of the pot, and a player holding a second highest ranking hand is also awarded a percentage of the pot. An exemplary split between highest and next highest hand is 80/20 for example.

The second pot may be separate from the first pot. For example, the first and second pots may include chips located in separate areas on a gaming table when the wagering game is conducted live in a casino. As another example, the first and second pots may be displayed as separate amounts on one or more of video displays 374, 418, 430, 532, 560, 564, and 558 (see FIGS. 5, 6, 7, and 9) (e.g., a monitor) controlled by one or more of processors 350, 414, 428, 597, and 642 (see FIGS. 5, 6, 7, and 9) and may be maintained in separate accounts when the wagering game is conducted online. The second wager may enable a player to be eligible to win an additional award, such as, for example, a progressive payout for a predetermined premium hand.

In one embodiment, all odds payouts are paid out of the second pot, and all losses are accumulated in the second pot. When a predetermined event occurs, such as a player holding a predetermined premium hand such as a royal flush in hearts, for example, the administrator of the game may award the entire second pot to the player holding the premium hand at operation 214.

In other embodiments, all normal game wagers such as the ante and all play wagers in the present game are placed in the second pot, and all payouts are made from the second pot. Excess amounts that grow in the pot are redistributed to players in the form of a dividend distribution (e.g., a share of the second pot awarded to each participating player), from the second pot. The second wager may comprise, for example, the ante wager or any of the play wagers.

In some embodiments, the second wager may be a mandatory wager. In other embodiments, the second wager may be optional, and a player wishing to play the poker wagering game may do so by placing a bet in the first pot without placing the second wager and without being eligible to win any award from the second pot. In some embodiments, the second wager may include multiple sub-wagers. For example, the second wager may include an ante wager, a first play wager, a second play wager and a third play wager. In other embodiments, a third pot (not shown) for participating in a progressive side bet game is provided. Such third pots may be separate from the other pots, or may be combined with one of the other pots. The second wager may be accepted, for example, by performing any of the acts described previously in connection with FIG. 1.

In some embodiments, the second pot may be a pooled or linked pot. For example, the second pot may include second wagers accepted from multiple concurrent wagering games, which may include only second wagers from those wagering games currently being played or may include accumulated second wagers from past wagering games. As specific, non-limiting examples, the second pot may include all second wagers accepted from a group of tables or local wagering game administration devices at a casino, from multiple groups of remote devices connected to network gaming architecture, or both. In other embodiments, the second pot may not be pooled, and awards for the second wager may be limited to the amounts wagered at a respective table, local wagering game administration device, or group of remote devices.

A rake (e.g., a commission for the house) may be taken on at least one of the first and second wagers, as indicated at operation 206. For example, the house may collect a portion of the second wager at the time the second wager is placed or may collect a portion of amounts awarded from the second pot at the time the second pot or a portion of the second pot is awarded. The rake may comprise, for example, a fixed percentage of the second wager. More specifically, the percentage of the second wager collected for the rake may be, for example, greater than a theoretical house advantage for the underlying game. As another example, the rake may be less than an average house advantage for play of the wagering game by all players, including average and sub-average players, which may be calculated using a historical house advantage for the wagering game (e.g., a house advantage for the wagering game over the last 5, 10, or 15 years for a given casino or other gaming establishment). As specific, nonlimiting examples, the percentage of the second wager collected for the rake may be between 3% and 8%, between 4% and 7%, or between 5% and 6%. In other embodiments, the portion of the second wager collected for the rake may comprise a variable percentage of the second wager or may comprise a fixed quantity (e.g., a flat fee) irrespective of the total amount for the second wager, a fixed percentage with a cap, or a time-based fee for increments of time playing the wagering game.

All profits for the house may be made from the rake in some embodiments. In such embodiments, all second wagers in excess of the rake may be redistributed back to the players, rather than be collected by the house as additional revenue. Such limiting of profits for the house and redistribution of second wagers back to the players may increase the attractiveness of the wagering game to both inexperienced and highly skilled players. Because the amount earned by the house is known, highly skilled players may perceive that their skill will enable them to increase winnings, and inexperienced players may be enticed by the possibility of winning the second pot or a portion thereof. In other embodiments, the house may make profits on the rake and on losses from one or more of the wagers (e.g., ante and play wagers), including losses resulting from optimal and suboptimal play. The rake may be maintained in a rake account, and profits for the house may be deducted from the rake account. The rake may be taken by, for example, electronically transferring funds from the second pot to a rake account (e.g., as instructed by a game server 606 (see FIG. 8) using casino account servers 610 (see FIG. 8)) or physically removing or exchanging money or representations of money from the second pot on a live table.

A round of the underlying wagering game may be played, as indicated at operation 208. For example, the underlying wagering game may be played at least substantially as described previously in connection with FIGS. 1 through 3. In one embodiment, an additional side wager is played between players, rather than against a pay table. The additional side wager may be a fixed amount, such as an amount equal to the ante bet. The additional side wager is added to a first pot that is completely distributed at the end of each round of play. The distribution of the additional side wager may be based, for example, on the highest player hand at the conclusion of the game. The ante and play wagers are added to a second progressive pot for distribution based on the pay table. In this way, the first pot allows the players to compete based on hand strength against other players, while the second pot is able to support larger progressive awards based on a pay table.

At the end of a round of play, the first wager may be resolved and at least a portion of the first pot may be awarded to at least one player, as indicated at operation 210. Each successive round of making wagers, dealing cards, and resolving wagers may constitute a round of play, and the first pot or a portion of the first pot may be awarded to at least one player at the end of each round of play. The player to whom the first pot or the portion of the first pot is awarded may hold a winning hand or at least a tying hand for that round of play according to the rules of the underlying wagering game. Awarding the first pot or the portion of the first pot may comprise crediting a player account of each wining player or may comprise distributing physical money or physical representations of money to each winning player.

In some embodiments, an entire amount of the first pot may be awarded to at least one player at the end of each round of play. In such embodiments, the first pot may be a non-progressive pot. Awarding the entire first pot to at least one player at the end of each round of play may enable the wagering game to qualify as a legal form of online "poker" play under some relevant statutes. For example, in games that require a mandatory pot bet that may or may not be raked, and that has no house advantage, and all other bets go into a second pot that is raked, the game may qualify as "poker" to gaming authorities, especially for online versions of the games. Awarding the entire amount of a first pot to at least one player at the end of each round of play redistributes lost first wagers attributable to suboptimal play to other players, rather than to the house. Accordingly, such a wagering game may be particularly attractive to players who perceive themselves as being highly skilled in the wagering game and, therefore, more able to take advantage of suboptimal play by other players. In some embodiments, a portion of the first pot may be awarded to at least one player at the end of each round of play. For example, the house may take a rake on the first wager, which may still enable the wagering game to qualify as a legal form of online gambling under some relevant statutes. The rake taken may comprise, for example, between 1% and 8%, between 2% and 6%, or between 3% and 5% of the first wager. The rake amounts on each wager may be more than, less than, or equal to the rake taken on other wagers in some embodiments. In still other embodiments, a portion of the first pot may remain in the first pot or be redistributed to another pot (e.g., the second pot) to be awarded in a subsequent round of play as a progressive payout or a dividend distribution. In such an example, the portion of the wager remaining in the first pot or redistributed to another pot may comprise, for example, a fixed percentage of the first wager, a variable percentage of the first wager (e.g., an odds payout may be awarded and the remainder retained in the first pot or redistributed to the other pot), or a fixed amount.

In lieu of, or in addition to, a rake taken on one or more wagers or from winnings, the house may be compensated in a number of other ways including, without limitation, a flat fee per round of play, a percentage of wagers made with or without a cap, rental of a player "seat," or otherwise as is known in the gaming art. All such compensation may be generally referred to as a commission.

All or portions of the second pot are distributed when there is a qualifying event, as indicated by operation 212. In embodiments where the second pot is a progressive pot, at least a portion of the second pot may be awarded to at least one player when a predetermined non-premium winning hand combination is dealt, as indicated at operation 214, or when a premium winning hand composition is dealt, as indicated at operation 216. The second pot may not be awarded at the end of each round of play, but may grow during each successive round in which no player is dealt a premium winning hand combination. Awarding the second pot or a portion of the second pot may comprise crediting a player account with funds from the second pot or may comprise distributing physical money or physical representations of money from the pot to the player. In some embodiments involving a no-house-advantage first pot awarded at the end of each round and a progressive second pot that receives all other game bets, all players participating in the wagering game who have made the second pot wager may be eligible to win the second pot or a portion of the second pot. Players who are ineligible to win the first pot, and players who have folded but still have one or more other active bets in play, may be eligible to win the second pot or a portion of the second pot.

A predetermined winning hand combination may comprise, for example, four of a kind, a full house, a flush, a straight, three of a kind, two pair, or one pair. The hands qualifying as new winning hand combinations may be predetermined at the beginning of each round of play in some embodiments. In other embodiments, new winning hand combinations may be predetermined at the beginning of play and may remain fixed until at least one player achieves a predetermined winning hand combination, at which time new winning hand combinations may be predetermined. In still other embodiments, the hand combinations qualifying as winning hand combinations may be predetermined at the outset of the wagering game and remain fixed for the duration of the wagering game. The hands qualifying as winning hand combinations may be predetermined at random from a list of possible winning hand combinations, from among a schedule with a fixed rotation of possible winning hand combinations, or using a fixed table of winning hand combinations.

A premium winning hand composition may comprise, for example, four of a kind, a straight flush, a royal flush, or a royal flush of a certain suit. The hand compositions qualifying as premium winning hand compositions may remain fixed throughout the duration of the wagering game or may change during the wagering game. For example, after a player has achieved a premium winning hand composition, the hand compositions qualifying as premium winning hand compositions may be made more restrictive or less restrictive. As a specific, nonlimiting example, after a player has achieved a straight flush, the hand compositions qualifying as premium winning hand compositions may be restricted to royal flushes or may be expanded to include four of a kind. The hands qualifying as premium winning hand compositions may be predetermined at random from a list of possible premium winning hand compositions, following a schedule with a fixed rotation of possible premium winning hand compositions, or according to a fixed table of premium winning hand compositions.

In embodiments where the second pot is a progressive pot, the amount awarded from the second pot for achieving a premium winning hand composition may be a progressive payout at least as great as a maximum progressive payout for achieving a predetermined winning hand composition. For example, the entire second pot may be awarded when a player or multiple players are dealt a premium winning hand composition, and only a portion of the second pot may be awarded when a player or multiple players are dealt a predetermined winning hand combination.

In embodiments, the qualifying event at operation 212 is based on a predetermined event that is not based on hand composition. In embodiments where the amount of the second pot is adjusted using a dividend refund method, the second pot, less the rake, may be distributed among the players upon the occurrence of a predetermined event. The predetermined event may not be based, for example, on player skill or chance events occurring in the underlying wagering game. The predetermined event may comprise, for example, an expiration of a time limit or an amount of the pot reaching a certain threshold amount. The pot, which has already been raked, less a minimum seed amount is divided pro-rata between players who are currently participating, to players who contributed to the pot, or to players according to another distribution method. The distribution can take the form of a debit to a player account, and the distribution does not take place as part of a game play event. Players may receive dividend refunds on play conducted on a live gaming table, on a game administered by an electronic gaming machine, or remote gaming device.

In some embodiments, the dividend distributions may not be paid to players who have not contributed to the second pot since the last dividend distribution was paid. The percentage of the second pot, less the rake, paid to each player as a dividend distribution may be, for example, approximately equal to the percentage of hands won by each player, the percentage of first pot winnings won by each player, the percentage of total amounts wagered by each player, the proportional number of wagers made by each player, the proportional length of time spent playing the wagering game by each player, or an equal percentage for each player eligible to receive a dividend distribution from the second pot.

Alternatively, the second pot and/or any other pots may be distributed (wholly or partially) in response to a predetermined event or condition. The predetermined event or condition may be time-based, pot-based (or pool-based), game-based, or other. Further details on pot distributions based on predetermined events and conditions are disclosed in the U.S. patent application Ser. No. 13/871,824, filed Apr. 26, 2013, and titled "Distributing Supplemental Pot in Wagering Games Based on Predetermined Event," the disclosure of which is incorporated herein in its entirety by this reference.

In some embodiments, the second pot may be seeded with money from the rake account or reserve account at the beginning of play, after the second pot or a portion of the second pot has been awarded, or both. For example, the second pot may be seeded from the rake account of the house, and the house may maintain an amount of funds in the rake account sufficient to significantly reduce (e.g., to essentially eliminate) the likelihood that any payouts made from the rake account and any seeding amounts withdrawn from the rake account exhaust or overdraw the rake account. In some embodiments, a casino reserve account may be provided to fill the rake account in the event of an overdraw. Such seeding may incentivize players to participate in the wagering game, and specifically to place the second wager to be eligible for the second pot. In addition, such seeding may reduce the likelihood that the amount of funds in the second pot may be insufficient to cover all the payouts to players. For example, where a player achieves a premium winning hand composition in one round of play, a player achieves a predetermined winning hand combination in the immediately following round of play, and a fixed odds payout is to be awarded to the player holding the predetermined winning hand combination, the amount seeded to the second pot between those rounds of play may be at least as great as the maximum fixed odds payout awardable for any predetermined winning hand combination. The second pot may be seeded each time the second pot is awarded in its entirety or each time the amount in the second pot is lower than the maximum fixed odds payout.

As a specific, nonlimiting example, a player-banked wagering game may comprise receiving an ante bet and additional side bet from a plurality of players. The additional side bet is added to a first poker pot that is not raked, having no house advantage, and being completely distributed to the players after each round. The ante bet and any subsequent play bets may be added to a second game pot having a progressive payout for achieving a predetermined rank, such as a rank listed on a pay table as described above. After placing the ante bet and, optionally, an additional side bet, the game is played as described above. Additional bets in the hand are added to the second pot. After completing the hand, the first pot is awarded to the player remaining in the hand with the highest hand. The second pot is a progressive pot and awards a hand that matches a pay table.

As another specific, nonlimiting example, a player-banked wagering game may comprise receiving an ante bet and additional side bet from a plurality of players. The additional side bet is added to a first pot that is not raked, having no house advantage, and being completely distributed to the players after each round. The ante bet and any play bets are added to a second pot having a dividend payout for reaching a predetermined event. After placing the ante bet and additional side bet, the player play of a game round is provided as described above. Any additional bets are added to the second pot. After completing the hand, the first pot is awarded to the player remaining in the hand with the highest hand. The second pot is a progressive pot and awards a distribution from the second pot based on a predetermined event. The predetermined event may be selected from the group consisting of participating for a predetermined number of hands, completing a predetermined number of rounds, reaching a predetermined time limit, or reaching a predetermined amount in the second pot.

In some embodiments, wagering games may be played without risking money in connection with the wagers (i.e., "play-for-fun" games). Access to play-for-fun wagering games may be granted on a time period basis in some embodiments. For example, upon initially joining the wagering game, each player may automatically be given wagering elements, such as, for example, chips, points, or simulated currency, that is of no redeemable value. After joining, the player may be free to place bets using the wagering elements and a timer may track how long the player has been participating in the wagering game. If the player exhausts his or her supply of the wagering elements before a predetermined period of time has expired, the player may simply wait until the period of time passes to rejoin the game and receive another quantity of the wagering elements to resume participation in the wagering game.

In some embodiments, a hierarchy of players may determine the quantity of wagering elements given to a player for each predetermined period of time. For example, players who have been participating in the wagering game for a longer time, who have played closest to optimal strategy for the game, who have won the largest percentage of wagers, or who have won the largest quantities of wagering elements from their wagers may be given more wagering elements for each allotment of time than players who have newly joined, who have played according to poor strategy, who have lost more frequently, or who have lost larger quantities of wagering elements. In some embodiments, the hierarchy of players may determine the duration of each allotment of time. For example, players who have been participating in the wagering game for a longer time, who have played closest to optimal strategy for the game, who have won the largest percentage of wagers, or who have won the largest quantities of wagering elements from their wagers may be given shorter allotments of times to wait after exhausting their supply of wagering elements than players who have newly joined, who have played according to poor strategy, who have lost more frequently, or who have lost larger quantities of wagering elements. In some embodiments, players who have not run out of wagering elements after the period of time has expired may have the balance of their wagering elements reset for a subsequent allotment of time. In other embodiments, players who have not run out of wagering elements may retain their remaining wagering elements for subsequent allotments of time, and may receive additional wagering elements corresponding to the new allotment of time to further increase the balance of wagering elements at their disposal. Players may be assigned to different categories of players, which determine the number of wagering elements awarded. In a given period of time, higher level players, or players who have invested more time playing the game may earn more wagering elements per unit of time than a player assigned to a lower level group.

In some embodiments, a player may be permitted to redeem an access token of no redeemable face value, such as, for example, points associated with a player account (e.g., social media account credits, online points associated with a transacting account, etc.), to compress the period of time and receive more wagering elements. The access tokens may be purchased or may be obtained without directly exchanging money for the access tokens. For example, access tokens may be acquired by participating in member events (e.g., completing surveys, receiving training on how to play the wagering game, sharing information about the wagering game with others), spending time participating in the wagering game or in a player account forum (e.g., logged in to a social media account), or viewing advertising. Thus, an entity administering play-for-fun wagering games may not receive money from losing player wagers or may not take a rake on wagers, but may receive compensation through advertising revenue or through the purchase of access tokens redeemable for time compressions to continue play of the wagering game or simply to increase the quantity of wagering elements available to a player.

After a player has stopped participating in a play-for-fun wagering game, any remaining quantities of the wagering elements may be relinquished by the player in some embodiments. For example, logging out of a play-for-fun wagering game administered over the Internet may cause any remaining wagering elements associated with a respective player to be lost. Thus, when the player rejoins the play-for-fun wagering game, the quantity of wagering elements given to the player for an allotment of time may not bear any relationship to the quantity of wagering elements held by the player when he or she quit playing a previous session of the wagering game. In other embodiments, the quantity of wagering elements held by a player when stopping participation may be retained and made available to the player, along with any additional quantities of wagering elements granted for new allotments of time, when rejoining the wagering game.

Figure 5:
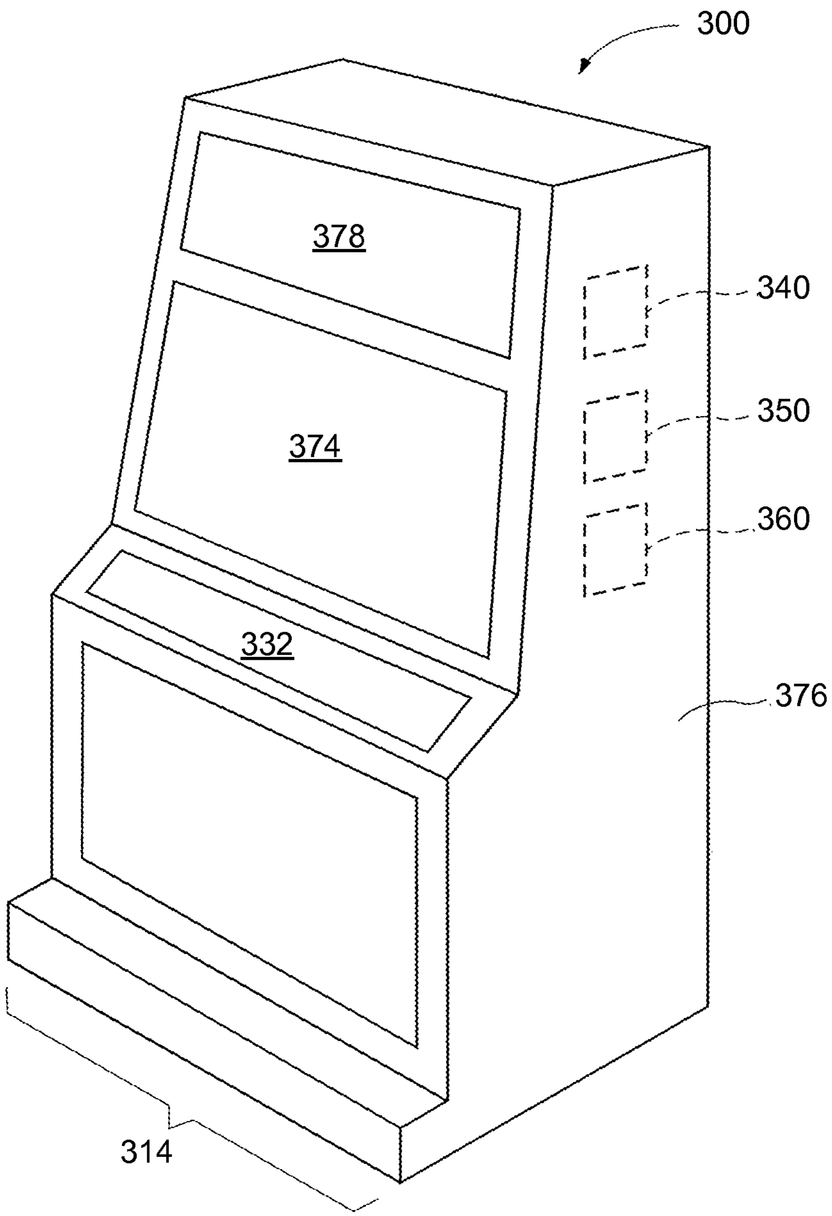
FIG. 5 is a perspective view of an individual electronic gaming device configured for implementation of embodiments of wagering games.

Referring to FIG. 5, an example of an individual electronic gaming device 300 configured for implementation of embodiments of wagering games according to the present disclosure is shown. The individual electronic gaming device 300 may include an individual player position 314 that includes a player input area 332 for a player to interact with the individual electronic gaming device 300 through various input devices (not shown). The electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical playing cards, poker chips, and/or live personnel. The action may instead be simulated by a control processor 350 operably coupled to the memory 340 and interacting with and controlling the individual electronic gaming device 300. Although gaming device 300 of FIG. 5 has an outline of a traditional gaming cabinet, gaming device 300 may be implemented in any number of ways including, but not limited to, client software downloaded to a portable device, such as a smartphone, tablet, or laptop personal computer. Gaming device 300 may also be a non-portable personal computer (e.g., a desktop or all-in-one computer) or other computing device. In some embodiments, client software is not downloaded but is native to the device, or otherwise delivered with the gaming device 300 when received by a player.

A communication device 360 may be included and operably coupled to the control processor 350 such that information related operation of the gaming device 300, information related to the game play, or combinations thereof may be communicated between the gaming device 300 and other devices (not shown) through a suitable communication media, such as, for example, wired networks, Wi-Fi networks, and cellular communication networks.

The gaming screen 374 may be carried by a generally vertically extending cabinet 376 of the individual electronic gaming device 300. The individual electronic gaming device 300 may further include banners (not shown) configured to communicate rules of game play and/or the like, such as along a top portion 378 of the cabinet 376 of the gaming device 300. The individual electronic gaming device 300 may further include additional decorative lights (not shown), and speakers (not shown) for transmitting and/or receiving sounds during game play. Further detail of an example of an individual electronic gaming device (as well as other embodiments of tables and devices) is disclosed in U.S. patent application Ser. No. 13/215,156, filed Aug. 22, 2011, and titled "Methods of Managing Play of Wagering Games and Systems for Managing Play of Wagering Games," the disclosure of which is incorporated herein in its entirety by this reference.

Some embodiments may be implemented at locations that include a plurality of player stations. Such player stations may include an electronic display screen for display of game information, such as displaying virtual cards, virtual chips, and game instructions, and for accepting wagers and facilitating credit balance adjustments. Such player stations may, optionally, be integrated in a table format, may be distributed throughout a casino or other gaming site, or may include both grouped and distributed player stations. While some features may be automated through electronic interfaces (e.g., virtual cards, virtual chips, etc.), some features may remain in the physical domain. As such, the game play may be administered by a live dealer, a virtual dealer, or a combination of both.

Figure 6:
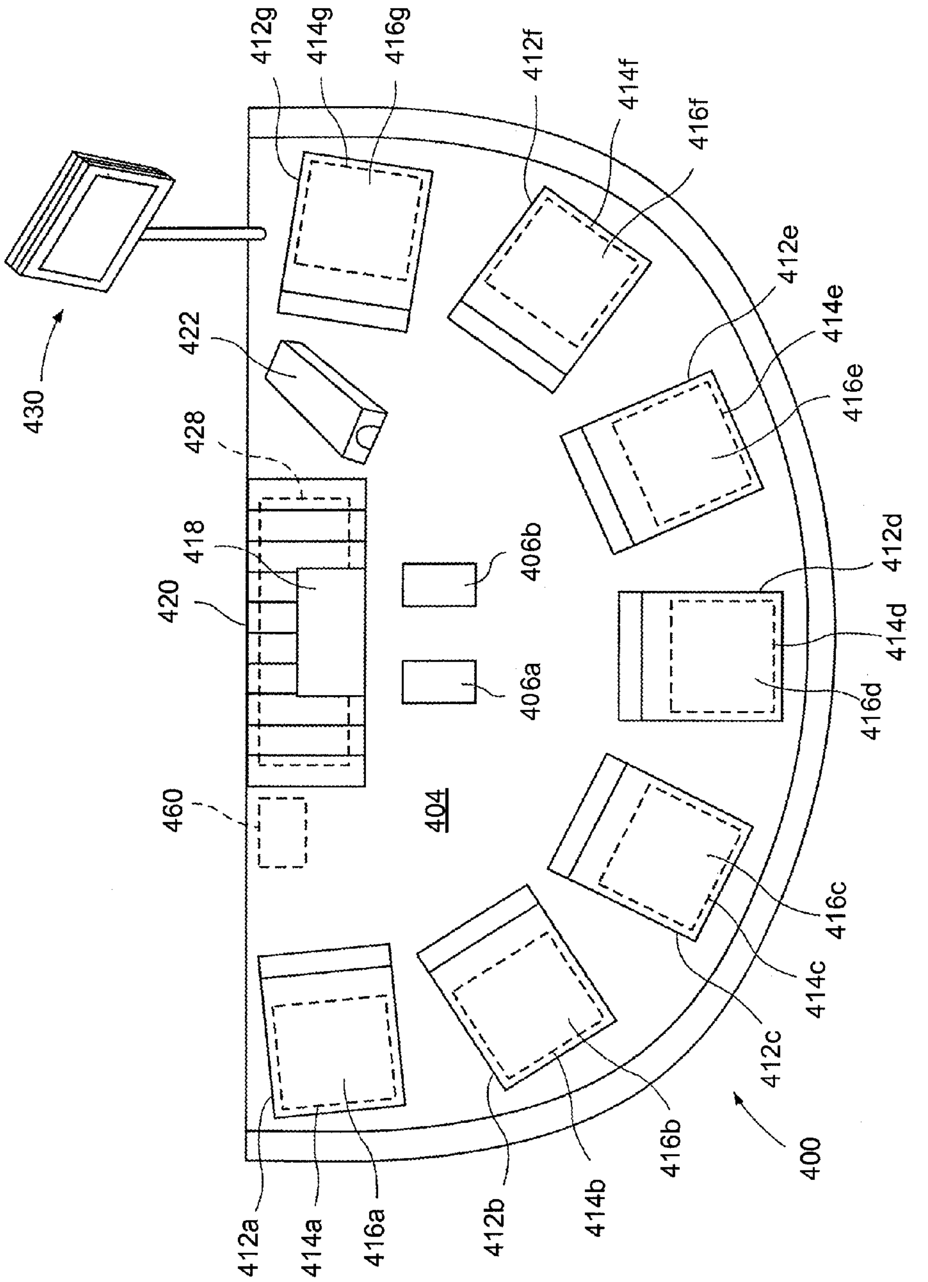
FIG. 6 is a top view of a suitable table configured for implementation of embodiments of wagering games.

Referring to FIG. 6, an example of a suitable table 400 configured for implementation of embodiments of wagering games according to the present disclosure is shown. The table 400 may include a playing surface 404. The table 400 may include a plurality of player stations **412*a* through 412*g*. Each player station 412*a* through 412*g* may include a player interface 416*a* through 416*g*, which may be used for displaying game information (e.g., game instructions, input options, wager information including virtual chips, game outcomes, etc.). The player interface 416***a* through 416*g* may include a display screen in the form of a touch screen, which may be at least substantially flush with the playing surface 404 in some embodiments. Each player interface 416*a* through 416*g* may be coupled respectively with its own local game processor 414*a* through 414*g* (shown in dashed lines), although in some embodiments, a central game processor 428 (shown in dashed lines) may be employed and communicate directly to player interfaces 416*a* through 416*g*. In some embodiments, a combination of individual local game processors 414*a* through 414*g* and a central game processor 428 may be employed.

A communication device 460 (shown in dashed lines) may be included and operably coupled to one or more of the local game processors 414, the central game processor 428, or combinations thereof, such that information related operation of the table 400, information related to the game play, or combinations thereof may be communicated between the table 400 and other devices (not shown) through a suitable communication media, such as, for example, wired networks, Wi-Fi networks, and cellular communication networks.

The table 400 may further include additional features, such as a dealer chip tray 420, which may be used by the dealer to cash players in and out of the wagering game, whereas wagers and balance adjustments during game play may be performed using virtual chips. For embodiments using physical cards 406*a* and 406*b*, the table 400 may further include a card handling device 422 that may be configured to shuffle, read, and deliver physical cards for the dealer and players to use during game play or, alternatively, a card shoe configured to read and deliver cards that have already been randomized. For embodiments using virtual cards, such virtual cards may be displayed at the individual player interfaces 416*a* through 416*g*. Common virtual cards may be displayed in a common card area (not shown).

The table 400 may further include a dealer interface 418, which, like the player interfaces 414*a* through 414*g*, may include touch screen controls for assisting the dealer in administering the wagering game. The table 400 may further include an upright display 430 configured to display images that depict game information such as pay tables, hand counts, historical win/loss information by player, and a wide variety of other information considered useful to the players. The upright display 430 may be double-sided to provide such information to players as well as to the casino pit.

Further detail of an example of a table and player displays is disclosed in U.S. Patent Application Pub. No. 2010/0016050, filed Jul. 15, 2008, and titled "Split Screen on a Chipless Gaming Table," the disclosure of which is incorporated herein in its entirety by this reference. Although an embodiment is described showing individual discrete player stations, in some embodiments, the entire playing surface 404 may be an electronic display that is logically partitioned to permit game play from a plurality of players for receiving inputs from, and displaying game information to, the players, the dealer, or both.

Figure 7:
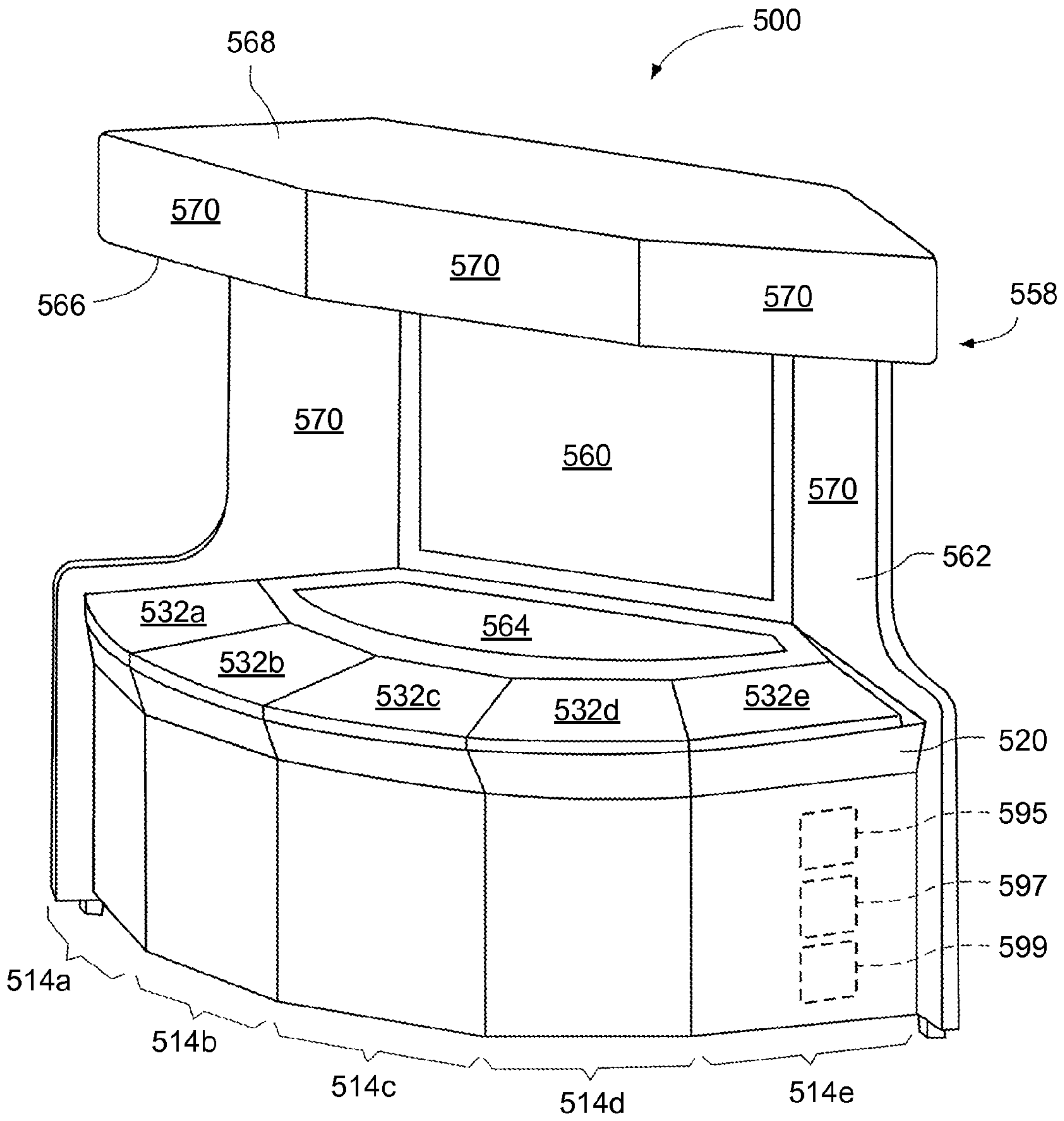
FIG. 7 is a perspective view of another embodiment of a suitable table configured for implementation of embodiments of wagering games having a virtual dealer.

Referring to FIG. 7, another example of a suitable table 500 configured for implementation of embodiments of wagering games having a virtual dealer according to the present disclosure is shown. The table 500 may include player positions 514*a* through 514*e* that are arranged in a bank about an arcuate edge 520 of a video device 558 that may comprise a card screen 564 and a dealer screen 560. The dealer screen 560 may display a video simulation of the dealer (i.e., a virtual dealer) for interacting with the video device 558, such as through processing one or more stored programs stored in memory 595 to implement the rules of game play at the video device 558. The dealer screen 560 may be carried by a generally vertically extending cabinet 562 of the video device 558. The card screen 564 may be configured to display at least one or more of the dealer's cards, community cards, and/or player's cards by the virtual dealer on the dealer screen 560 (virtual dealer not shown in FIG. 7).

Each of the player positions 514*a* through 514*e* may include a player interface area 532*a* through 532*e*, which is configured for wagering and game play interactions with the video device 558 and/or virtual dealer. Accordingly, game play may be accommodated without involving physical playing cards, poker chips, and/or live personnel. The action may instead be simulated by a control processor 597 interacting with and controlling the video device 558. The control processor 597 may be located internally within, or otherwise proximate to, the video device 558. The control processor 597 may be programmed, by known techniques, to implement the rules of game play at the video device 558. As such, the control processor 597 may interact and communicate with display/input interfaces and data entry inputs for each player interface area 532*a* through 532*e* of the video device 558. Other embodiments of tables and gaming devices may include a control processor that may be similarly adapted to the specific configuration of its associated device.

A communication device 599 may be included and operably coupled to the control processor 597 such that information related to operation of the table 500, information related to the game play, or combinations thereof may be communicated between the table 500 and other devices (not shown) through a suitable communication media, such as, for example, wired networks, Wi-Fi networks, and cellular communication networks.

The video device 558 may further include banners (not shown) configured to communicate rules of play and/or the like, which may be located along one or more walls 570 of the cabinet 562. The video device 558 may further include additional decorative lights (not shown) and speakers (not shown), which may be located on an underside surface 566, for example, of a generally horizontally depending top 568 of the cabinet 562 of the video device 558 generally extending toward the player positions 514*a* through 514*e*.

Further detail of an example of a table and player displays is disclosed in U.S. Patent Application Pub. No. 2005/0164762, filed Jan. 26, 2004, and titled "Automated Multiplayer Game Table with Unique Image Feed of Dealer," the disclosure of which is incorporated herein in its entirety by this reference. Although an embodiment is described showing individual discrete player stations, in some embodiments, the entire playing surface (e.g., player interface areas 532*a* through 532*e*, card display 564, etc.) may be an electronic display that is logically partitioned to permit game play from a plurality of players for receiving inputs from, and displaying game information to, the players, the dealer, or both.

Figure 8:
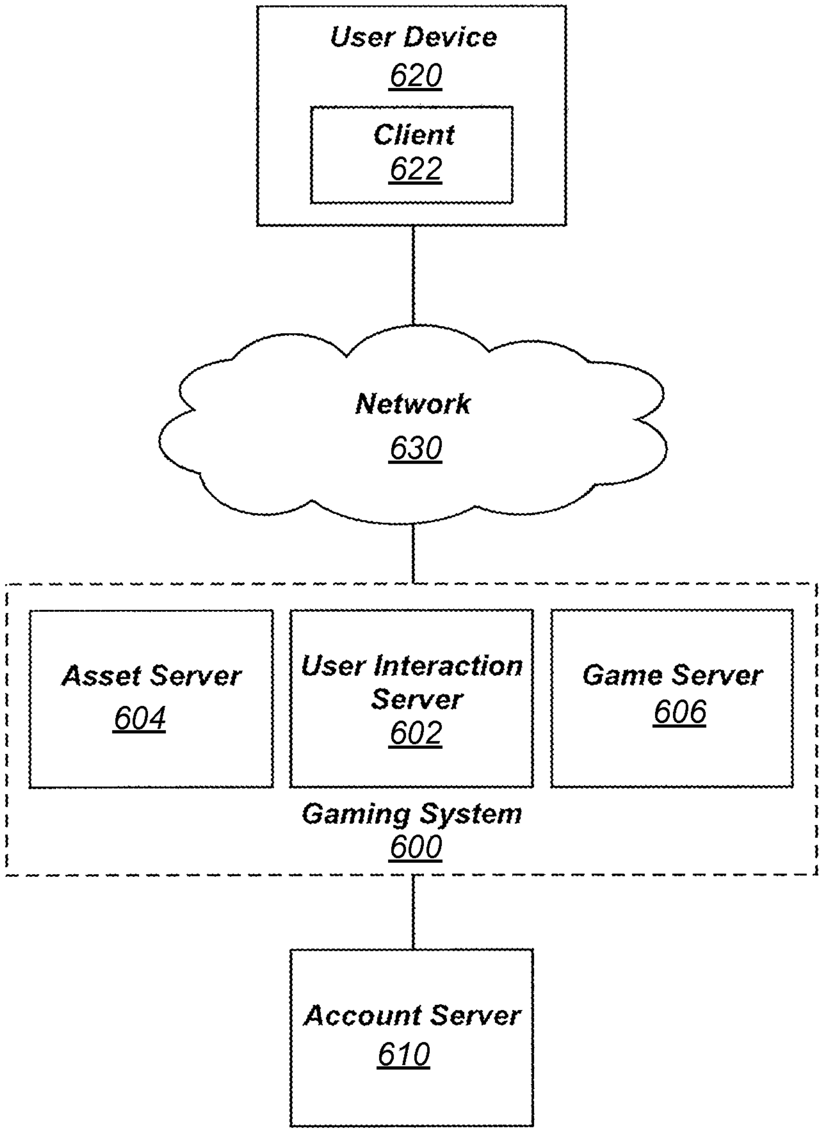
FIG. 8 is a schematic block diagram of a gaming system for implementing embodiments of wagering games.

Wagering games, in accordance with embodiments of the disclosure, may be administered over the Internet, or otherwise online, in one embodiment using a gaming system employing a client server architecture. Referring to FIG. 8, a schematic block diagram of a gaming system 600 for implementing wagering games according to an embodiment is shown. The gaming system 600 enables end users to access proprietary and/or non-proprietary game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not be limited to, Class II and Class III games as defined under 25 U.S.C. §2701 et seg. ("Indian Gaming Regulatory Act"). Such games may include banked and/or non-banked games.

The wagering games supported by the gaming system 600 may be operated with real currency or with virtual credits or other virtual (e.g., electronic) value indicia. For example, the real currency option may be used with traditional casino and lottery-type wagering games in which money or other items of value are wagered and may be cashed out at the end of a game session. The virtual credits option may be used with wagering games in which credits (or other symbols) may be issued to a player to be used for the wagers. A player may be credited with credits in any way allowed including, but not limited to, a player purchasing credits, being awarded credits as part of a contest or a win event in this or another game (including non-wagering games), being awarded credits as a reward for use of a product, casino or other enterprise, time played in one session, games played, or may be as simple as virtual credits upon logging in at a particular time or with a particular frequency, etc. Although credits may be won or lost, the ability of the player to cash out credits may be controlled or prevented. In one example, credits acquired (e.g., purchased or awarded) for use in a play-for-fun game may be limited to non-monetary redemption items, awards, or credits usable in the future or for another game or gaming session. The same credit redemption restrictions may be applied to some or all of credits won in a wagering game as well.

An additional variation includes web-based sites having both play-for-fun and wagering games, including issuance of free (non-monetary) credits usable to play the play-for-fun games. This may attract players to the site and to the games before they engage in wagering. In some embodiments, a limited number of free or promotional credits may be issued to entice players to play the games. Another method of issuing credits includes free credits in exchange for identifying friends who may want to play. In another embodiment, additional credits may be issued after a period of time has elapsed to encourage the player to resume playing the game. The system may enable players to buy additional game credits to allow the player to resume play. Objects of value may be awarded to play-for-fun players, which may or may not be in a direct exchange for credits. For example, a prize may be awarded or won for a highest scoring play-for-fun player during a defined time interval. All variations of credit redemption are contemplated, as desired by game designers and game hosts (the person or entity controlling the hosting systems).

The gaming system 600 may include a gaming platform that establishes a portal for an end user to access a wagering game hosted by a game server 606 through a user interaction server 602. A user device 620 may communicate with a user interaction server 602 of the gaming system 600 using a network 630 (e.g., the Internet). The user interaction server 602 may communicate with the game server 606 and provide game information to the user. In some embodiments, the game server 606 may also be a game engine. In some embodiments, a single user device 620 communicates with a game provided by the game server 606, while other embodiments may include a plurality of user devices 620 configured to communicate and provide end users with access to the same game provided by the game server 606. In addition, a plurality of end users may access a single user interaction server 602, or a plurality of user interaction servers 602, to access game server 606.

The user interaction server 602 may communicate with the user device 620 to enable access to the gaming system 600. The user interaction server 602 may enable a user to create and access a user account and interact with gaming server 606. The user interaction server 602 may enable users to initiate new games, join existing games, and interface with games being played by the user.

The user interaction server 602 may also provide a client 622 for execution on the user device 620 for accessing the gaming system 600. The client 622 provided by the gaming system 600 for execution on the user device 620 can comprise a variety of implementations according to the user device 620 and method of communication with the gaming system 600. In one embodiment, the user device 620 connects to the gaming system 600 using a web browser and the client 622 executes within a browser window or frame of the web browser. In another embodiment, the client 622 is a stand-alone executable on the user device 620.

In one embodiment, the client 622 may comprise a relatively small amount of script (e.g., JAVASCRIPT®), also referred to as a "script driver," including scripting language that controls an interface of the client 622. The script driver may include simple function calls requesting information from the gaming system 600. In other words, the script driver stored in the client 622 may merely include calls to functions that are externally defined by, and executed by, the gaming system 600. As a result, the client 622 may be characterized as a "thin client." As that term is used herein, the client 622 may be little more than a script player. The client 622 may simply send requests to the gaming system 600 rather than performing logic itself. The client 622 receives player inputs and the player inputs are passed to gaming system 600 for processing and executing the wagering game. In one embodiment, this includes providing specific graphical display information to client 622, as well as game outcomes.

In other embodiments, the client 622 comprises an executable file rather than a script. In that case, client 622 may do more local processing than does a script driver, such as calculating where to show what game symbols upon receiving a game outcome from game server 606 through user interaction server 602. In one embodiment, it may be that portions of asset server 604 are loaded onto the client 622, and used by the client 622 in processing and updating graphical displays. Due to security and integrity concerns, most embodiments will have the bulk of the processing of the game play performed in the gaming system 600. However, some embodiments may include significant game processing by client 622 when the client and user device 620 are considered trustworthy or when there is reduced concern for security and integrity in the displayed game outcome. In most embodiments, it is expected that some form of data protection, such as end-to-end encryption, will be used when data is transported over network 630. Network 630 may be any network including, but not limited to, the Internet.

In an embodiment where the client 622 implements further logic and game control methodology beyond a thin client, the client 622 may parse and define player interactions prior to passing the player interactions to the gaming system 600. Likewise, when the client 622 receives a gaming interaction from the gaming system 600, the client 622 may be configured to determine how to modify the display as a result of the gaming interaction. The client 622 may also allow the player to change a perspective or otherwise interact with elements of the display that do not change aspects of the game.

In one form of the invention, the client 622 is part of an online casino that enables game play on gaming system 600 by players playing on the user device 620. The client 622 provides a portal to the gaming system 600 and the player may not be aware that a game that is being played on the online casino is being administered by the gaming system 600. In other embodiments, the gaming system 600 is an integral part of the online casino. In other embodiments, the gaming system 600 is operated by a different entity than the entity that operates the online casino.

The gaming system 600 may include an asset server 604, which may host various media assets (e.g., audio, video, and image files) that may be sent to the client 622 for presenting the various wagering games to the end user. In other words, in this embodiment the assets presented to the end user may be stored separately from the client 622. In one embodiment, the client 622 requests the assets appropriate for the game played by the user; in other embodiments, especially those using thin clients, just those assets that are needed for a particular display event will be sent by game server 600 when the game server 600 determines they are needed, including as few as one asset. In one example, the client 622 may call a function defined at the user interaction server 602 or asset server 604, which may determine which assets are to be delivered to the client 622, as well as how the assets are to be presented by the client 622 to the end user. Different assets may correspond to the various clients that may have access to the game server 606 or to different games to be played.

The game server 606 is configured to perform game play methods and determine game play outcomes that are provided to the user interaction server 602 to be transmitted to user device 620 for display on the end user's computer. For example, the game server 606 may include game rules for one or more wagering games, such that the game server 606 controls some or all of the game flow for a selected wagering game, as well as determining game outcomes. Game server 606 may include pay tables and other game logic. The game server 606 also performs random number generation for determining random game elements of the wagering game. In one embodiment, the game server 606 is separated from the user interaction server 602 by a firewall or other method of preventing unauthorized access to the game server 606 from the general members of the network 630.

The user device 620 may present a gaming interface to the player and communicate the user interaction to the gaming system 600. The user device 620 may be any electronic system capable of displaying gaming information, receiving user input, and communicating the user input to the gaming system 600. As such, the user device 620 can be a desktop computer, a laptop, a tablet computer, a set-top box, a mobile device including, but not limited to, smartphones, a kiosk, a terminal, or another computing device. The user device 620 may operate the client 622. When the user device 620 operates the client 622, the user device 620 may comprise an interactive electronic gaming system 300 (see FIG. 5), as described above. The client 622 may be a specialized application or may be executed within a generalized application capable of interpreting instructions from the interactive gaming system 600, such as a web browser.

The client 622 may interface with an end user through a web page, or an application that runs on a device including, but not limited to, a smartphone, a tablet, or a general computer, or be any other computer program configurable to access the gaming system 600. The client 622 may be illustrated within a casino webpage (or other interface) indicating that the client 622 is embedded into a webpage, which is supported by a web browser executing on the user device 620.

In one embodiment, the gaming system 600 may be operated by different entities. The user device 620 and/or device housing the client 622 may be operated by a third party, such as a casino or an individual, that links to the gaming system 600, which may be operated, for example, by a wagering game service provider. Therefore, in some embodiments, the user device 620 and client 622 may be operated by a different administrator than the operator of the game server 606. In other words, the user device 620 may be part of a third-party system that does not administer or otherwise control the gaming system 600 or game server 606. In another embodiment, the user interaction server 602 and asset server 604 are provided by a third-party system. For example, a gaming entity (e.g., a casino) may operate the user interaction server 602 or user device 620 to provide its customers access to game content managed by a different entity, which may control game server 606, amongst other functionality. In some embodiments, these functions are operated by the same administrator. For example, a gaming entity (e.g., a casino) may elect to perform each of these functions in-house, such as providing both the access to the user device 620 and the actual game content and providing administration of the gaming system 600.

The gaming system 600 may communicate with one or more external account servers 610, optionally through another firewall. For example, the gaming system 600 itself may not directly accept wagers or issue payouts. That is, the gaming system 600 may facilitate online casino gaming, but may not be part of a self-contained online casino itself. Instead, the gaming system 600 may facilitate the play of wagering games owned and controlled by a company offering games and gaming products and services, such as SHFL entertainment, Inc. Another entity (e.g., a casino or any account holder or financial system of record) may operate and maintain its external account servers 610 to accept bets and make payout distributions. The gaming system 600 may communicate with the account servers 610 to verify the existence of funds for wagering, and instruct the account server 610 to execute debits and credits.

In some embodiments, the gaming system 600 may directly accept bets and make payout distributions, such as in the case where an administrator of the gaming system 600 operates as a casino. As discussed above, the gaming system 600 may be integrated within the operations of a casino rather than separating out functionality (e.g., game content, game play, credits, debits, etc.) among different entities. In addition, for play-for-fun wagering games, the gaming system 600 may issue credits, take bets, and manage the balance of the credits according to the game outcomes, but may not permit payout distributions or be linked to an account server 610 that permits payout distributions. Such credits may be issued for free, through purchase, or for other reasons, without the ability for the player to cash out. Such play-for-fun wagering games may be played on platforms that do not permit traditional gambling, such as to comply with jurisdictions that do not permit online gambling.

The gaming system 600 may be configured in many ways, from a fully integrated single system to a distributed server architecture. The asset server 604, user interaction server 602, game server 606, and account server 610 may be configured as a single, integrated system of code modules running on a single server or machine, where each of the servers is functionally implemented on a single machine. In such a case, the functionality described herein may not be implemented as separate code modules. The asset server 604, user interaction server 602, game server 606, and account server 610 may also be implemented as a plurality of independent servers, each using its own code modules running on a separate physical machine, and may further include one or more firewalls between selected servers (depending on security needs). Each server could communicate over some kind of networked connection, potentially as varied as that described for network 630. Further, each single server shown in FIG. 8 may be implemented as a plurality of servers with load balancing and scalability factors built into the embodiment. All such embodiments and variations are fully contemplated.

Additional features may be supported by the game server 606, such as hacking and cheating detection, data storage and archival, metrics generation, messages generation, output formatting for different end user devices, as well as other features and operations. For example, the gaming system 600 may include additional features and configurations as described in U.S. patent application Ser. No. 13/353,194, filed Jan. 18, 2012, and U.S. patent application Ser. No. 13/609,031, filed Sep. 10, 2012 both titled "Network Gaming Architecture, Gaming Systems, and Related Methods," the disclosures of which are incorporated herein in their entirety by this reference.

The network 630 may enable communications between the user device 620 and the gaming system 600. A network (not shown) may also connect the gaming system 600 and account server 610, and, further, one or more networks (not shown) may interconnect one or more of the other servers shown collectively as game system 600. In one embodiment, the network 630 uses standard communications technologies and/or protocols. Thus, the network 630 can include links using technologies such as Ethernet, 802.11, worldwide interoperability for microwave access (WiMAX), 3G, digital subscriber line (DSL), asynchronous transfer mode (ATM), INFINIBAND®, PCI Express Advanced Switching, etc. Similarly, the networking protocols used on the network 630 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 630 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 630 can include links comprising one or more networks such as the Internet.

Figure 9:
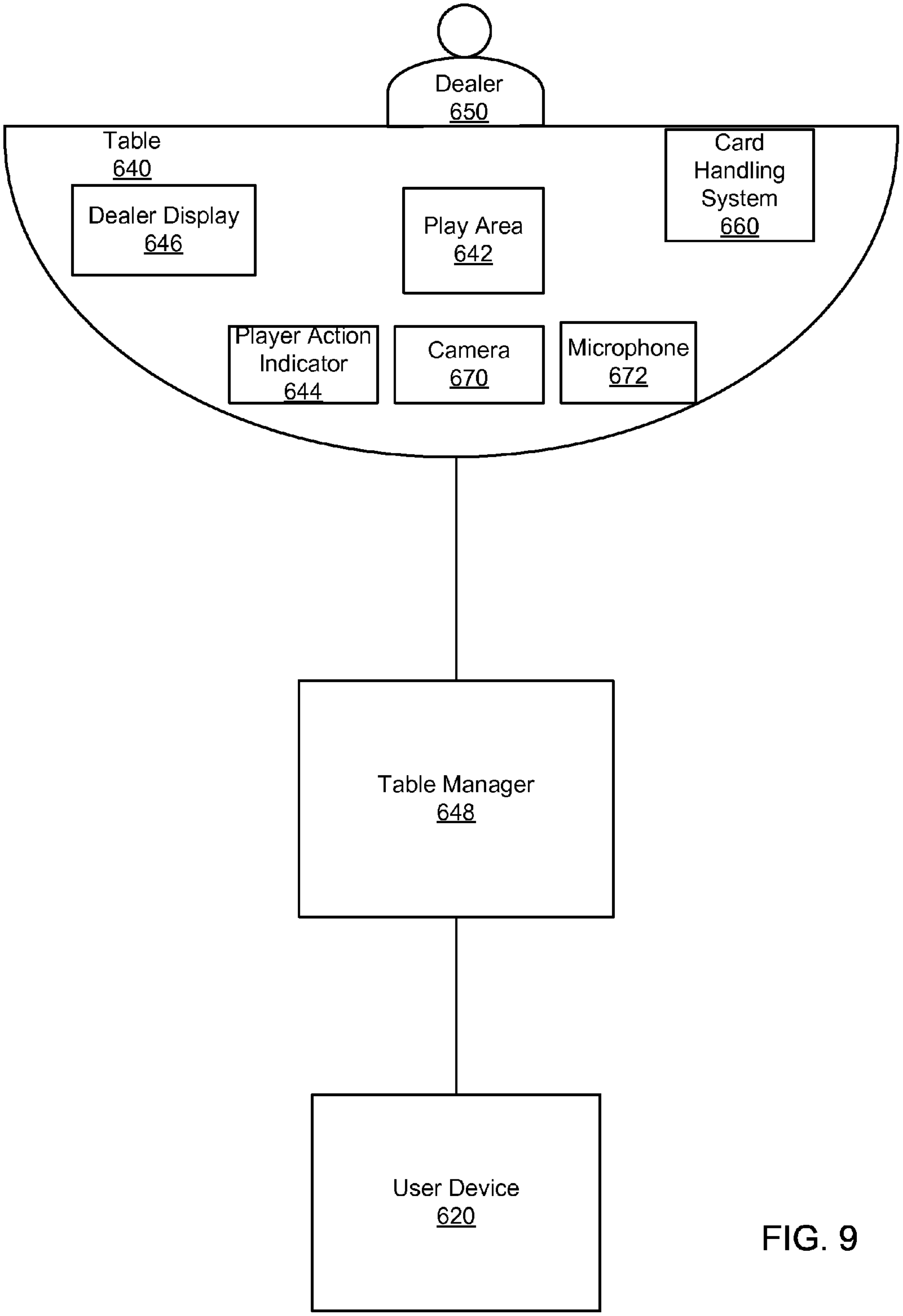
FIG. 9 is a schematic block diagram of a gaming system for implementing embodiments of wagering games including a live dealer feed.

FIG. 9 is a schematic block diagram of a gaming system for implementing embodiments of wagering games including a live dealer feed. Features of the gaming system 600 as described above (see FIG. 8) are generally implemented by this embodiment, except as further described. In this embodiment, rather than cards being determined by a computerized random process, cards are dealt by a dealer 650 at a table 640 from a card handling system 660. A table manager 648 assists the dealer 650 in facilitating play of the game by transmitting a video feed of the dealer's actions to the user device 620 and transmitting player elections to the dealer 650. As described above, the table manager 648 communicates with a gaming system 600 to provide gaming at table 640 to users of the gaming system 600. Thus, the table manager 648 communicates with the user device 620 through a network, and may be a part of a larger online casino, or may be operated as a separate system that facilitates game play. In various embodiments, each table 640 is managed by an individual table manager 648 constituting a gaming device, which receives and processes information relating to that table. For simplicity of description, these functions are described as being performed by the table manager 648, though certain functions may be performed by an intermediary gaming system 600. In some embodiments, the gaming system 600 may match players to tables 640 and facilitate transfer of information between user devices and gaming devices, such as wagering amounts and player action elections, but does not manage gameplay at individual tables. In other embodiments, functions of the table manager 648 are incorporated into a gaming system 600.

The table 640 includes a camera 670 and optionally a microphone 672 that capture video and audio feeds relating to the table 640. The camera 670 is trained on the dealer 650, play area 642, and card handling system 660. As the game is administered by the dealer 650, the player using the user device 620 is shown the video feed captured by the camera 670 and any audio captured by the microphone 672.

The card handling system 660 is typically a shuffling device, though the card handling system 660 may also be a shoe for dispensing cards. When the game play rules require cards to be dealt, the dealer 650 obtains a card from the card handling system 660 and places the card in the appropriate location in a play area 642. The play area 642 depicts player positions and any applicable card locations for playing the same, such as shown in FIGS. 2 and 3. As determined by the rules of the game, the player at the user device 620 is presented options for responding to an event in the game using a client 622, as described with reference to FIG. 8.

The user device 620 presents the options to the player and permits the player to select an election from among the options. The election is transmitted to the table manager 648, which provides player elections to the dealer 650 using a dealer display 646 and player action indicator 644 on the table 640. The dealer display 646 and player action indicator 644 provide information to the dealer 650 regarding the game play and elections made by players. Using the dealer display 646, for example, the dealer 650 may obtain information regarding where to deal the next card, or which player position is responsible for the next action.

In one embodiment, the table manager 648 receives card information from the card handling system 660 describing cards dealt by the card handling system 660. The card handling system 660 may include a card reader that determines card information from the card. For example, the card handling system 660 may process an image of the card, or the card handling system 660 may include a barcode reader or other system for obtaining information regarding each card. The card information may include rank and suit of each dealt card, which is obtained by the card handling system 660 and transmitted to the table manager 648. The card handling system 660 may also dispense more than one card at once, or identify a set of cards dispensed together as a hand. One example card handling system 660 is described in U.S. Pat. No. 8,070,574, which is hereby incorporated by reference.

Using the card information, the table manager 648 identifies hands associated with each player and, when applicable, the dealer. The table manager 648 uses the card information and identified hands, along with the elected player decisions, to determine gameplay events and, using the rules of the game, determine wager results. Alternatively, the wager results are determined by the dealer 650 and input to the table manager 648, and may be used to confirm automatically determined results by the gaming system. Optionally, the card information relating to cards viewable by a player is also transmitted to the user device 620 associated with the player, permitting representations of the cards to be displayed to the user in addition to the cards viewed in the play area 642.

The live video feed permits the dealer 650 to show cards dealt by the card handling system and play the game as though the player were at a live casino. In addition, the dealer 650 can prompt a user by announcing a player's election is to be performed. In embodiments where a microphone 672 is included, the dealer 650 can verbally announce action or request an election by a player. In some embodiments, the user device 620 also includes a camera or microphone, which also captures feeds to be shared with the dealer 650 and other players.

Figure 10:
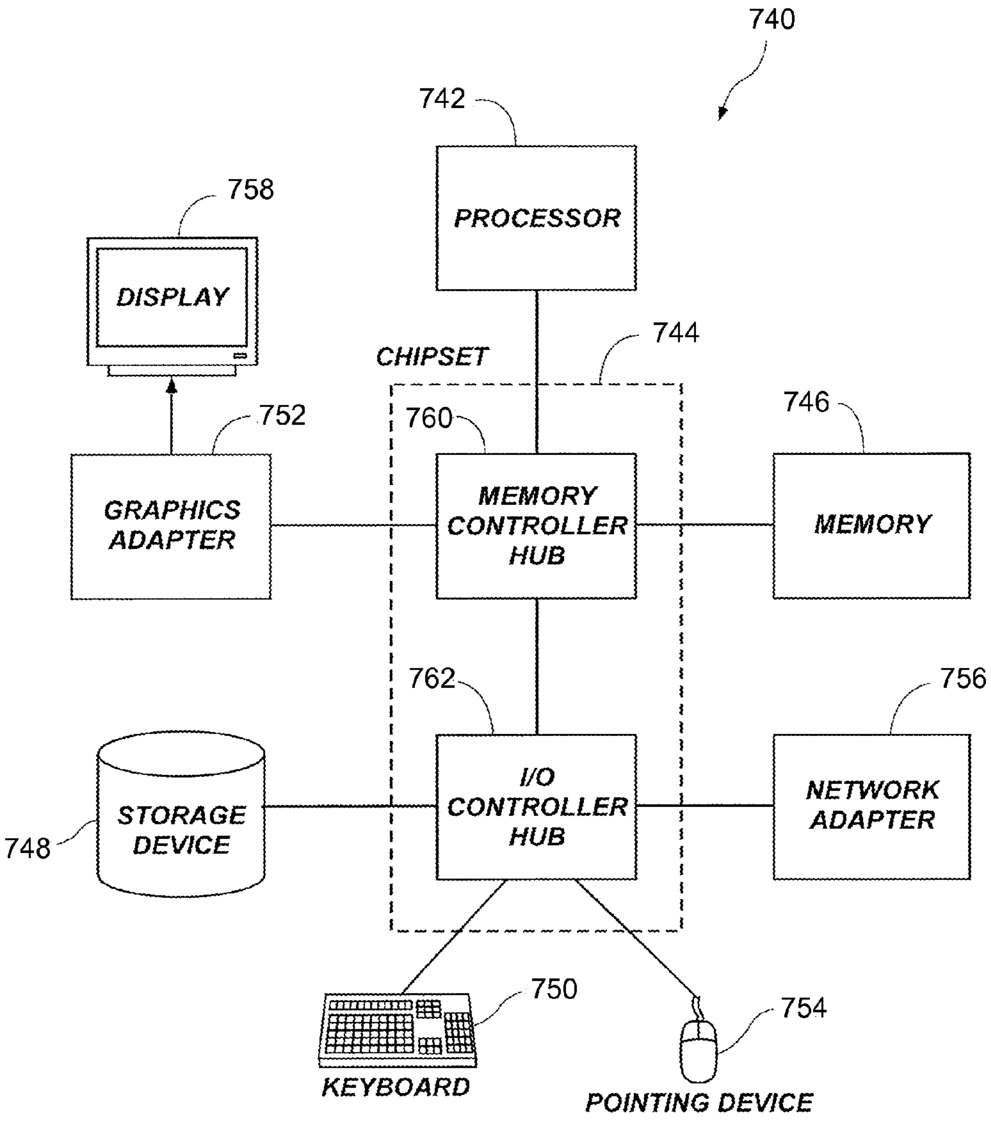
FIG. 10 is a block diagram of a computer for acting as a gaming system according to one embodiment.

Referring to FIG. 10, a high-level block diagram of a computer system 740 for acting as a gaming system 600 (see FIGS. 8 and 9) according to one embodiment is shown. Illustrated are at least one processor 742 coupled to a chipset 744, as indicated in dashed lines. Also coupled to the chipset 744 are a memory 746, a storage device 748, a keyboard 750, a graphics adapter 752, a pointing device 754, and a network adapter 756. A display 758 is coupled to the graphics adapter 752. In one embodiment, the functionality of the chipset 744 is provided by a memory controller hub 760 and an I/O controller hub 762. In another embodiment, the memory 746 is coupled directly to the processor 742 instead of the chipset 744.

The storage device 748 is any non-transitory computer-readable storage medium, such as a hard drive, a compact disc read-only memory (CD-ROM), DVD, or a solid-state memory device (e.g., a flash drive). The memory 746 holds instructions and data used by the processor 742. The pointing device 754 may be a mouse, a track pad, a track ball, or other type of pointing device, and is used in combination with the keyboard 750 to input data into the computer system 740. The graphics adapter 752 displays images and other information on the display 758. The network adapter 756 couples the computer system 740 to a local or wide area network.

As is known in the art, a computer system 740 can have different and/or other components than those shown in FIG. 9. In addition, the computer system 740 can lack certain illustrated components. In one embodiment, a computer system 740 acting as a gaming system 700 lacks a keyboard 750, pointing device 754, graphics adapter 752, and/or display 758. Moreover, the storage device 748 can be local and/or remote from the computer system 740 (such as embodied within a storage area network (SAN)). Moreover, other input devices, such as, for example, touch screens may be included.

The network adapter 756 (may also be referred to herein as a communication device) may include one or more devices for communicating using one or more of the communication media and protocols discussed above with respect to FIG. 8.

In addition, some or all of the components of this general computer system 740 of FIG. 10 may be used as part of the processor and memory discussed above with respect to the systems of FIGS. 5, 6, and 7.

The gaming system 600 may comprise several such computer systems 740. The gaming system 600 may include load balancers, firewalls, and various other components for assisting the gaming system 600 to provide services to a variety of user devices.

As is known in the art, the computer system 740 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 748, loaded into the memory 746, and executed by the processor 742.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Some portions of the disclosure are presented in terms of algorithms (e.g., as represented in flowcharts, prose descriptions, or both) and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality.

However, all of these and similar tennis are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware, or hardware, and when embodied in software, could be downloaded to reside on and be operated from different platforms used by a variety of operating systems. The embodiments can also be in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being within the scope of the disclosure, as contemplated by the inventor.

What is claimed is:

1. A computer-implemented method of managing play of a wagering game by a processor in communication with a set of user devices and a set of players, each player associated with a user device, comprising:

receiving, at a memory controller hub, an indication of an ante wager associated with a player in the set of players to participate in the wagering game from each user device in the set of user devices;

storing the indication of the ante wager in a memory device;

determining, with the processor, a set of partial player hands, each partial player hand including a number of randomized playing cards from a set of playing cards and each partial player hand associated with a player and an associated user device;

storing the set of partial player hands in the memory device;

providing, with the processor, each partial player hand to the user device associated with the partial player hand for display on the associated user device;

receiving, at the memory controller hub, a first play option including a fold or a first additional wager from each user device in the set of user devices;

storing the first play option in the memory device;

determining, with the processor, at least one first additional card to be added to each partial player hand of the set of partial player hands, which is insufficient to complete the partial player hand;

storing the at least one first additional card to be added to each partial player hand of the set of partial player hands in the memory device;

providing, with the processor, the at least one first additional card to the user device associated with the partial player hand to which the at least one first additional card is added;

responsive to receiving the first additional wager and providing the at least one first additional card, receiving, at the memory controller hub, a second play option including a fold or a second additional wager from each user device in the set of user devices;

storing the second play option in the memory device;

determining, with the processor, at least one second additional card to be added to each partial player hand of the set of partial player hands, which completes the partial player hand;

storing the at least one second additional card to be added to each partial player hand of the set of partial player hands in the memory device;

providing, with the processor, the at least one second additional card to the user device associated with the partial player hand to which the at least one second additional card is added;

storing a set of complete player hands in the memory device, the set of complete player hands including the set of partial player hands, the at least one first additional card added to each partial player hand of the set of partial player hands, and the at least one second additional card added to each partial player hand of the set of partial player hands;

comparing, with the processor, each complete player hand of the set of complete player hands against a plurality of predetermined winning outcomes; and resolving the ante wager, first additional wager, and second additional wager of each complete player hand of the set of complete player hands solely against the plurality of predetermined winning outcomes and not against a dealer hand.

2. The method of claim 1, wherein the ante wager comprises wagering elements.

3. The method of claim 2, wherein the wagering elements are play-for-fun credits.

4. The method of claim 2, further comprising awarding a quantity of the wagering elements to the set of players based on a hierarchy of the players within the set of players.

5. The method of claim 1, further comprising accepting, at the memory controller hub, a poker wager from each player and placing the poker wagers in a pot, wherein the pot is awarded to a player holding a highest ranking poker hand at the conclusion of a round of play.

6. The method of claim 5, wherein the pot has no house advantage.

7. The method of claim 5, further comprising:

adding the ante and play wagers to another pot; and awarding at least a portion of the another pot based on a predetermined event.

8. The method of claim 7, wherein a rake is collected on all wagers placed in the another pot.

9. The method of claim 7, wherein the predetermined event is selected from the group consisting of a predetermined number of hands, a predetermined number of rounds, a predetermined time limit, and a predetermined amount in the another pot.

10. The method of claim 7, wherein the predetermined event is a player hand meeting a qualifying premium hand.

11. The method of claim 7, wherein the another pot is a progressive pot.

12. The system of claim 11, wherein the ante wager comprises wagering elements.

13. A system for managing play of a wagering game, comprising:

a communication interface configured for communicating with a set of user devices and a set of players, each player of the set of players associated with a user device of the set of user devices;

a processor configured to execute instructions; and a set of instructions stored on a non-transitory computer-readable medium that when executed by the processor causes the processor to:

cause an indication of an ante wager associated with a player in the set of players to participate in the wagering game from each user device in the set of user devices to be received at a memory controller hub;

cause the indication of the ante wager to be stored in a memory device;

determine a set of partial player hands, each partial player hand including a number of randomized playing cards from a set of playing cards and each partial player hand associated with a player and an associated user device;

cause the set of partial player hands to be stored in the memory device;

provide each partial player hand to the user device associated with the partial player hand for display on the associated user device;

cause a first play option including a fold or a first additional wager from each user device in the set of user devices to be received at the memory controller hub;

cause the first play option to be stored in the memory device;

determine at least one first additional card to be added to each partial player hand of the set of partial player hands, which is insufficient to complete the partial player hand;

cause the at least one first additional card to be added to each partial player hand of the set of partial player hands to be stored in the memory device;

provide the at least one first additional card to the user device associated with the partial player hand to which the at least one first additional card is added;

responsive to receiving the first additional wager and providing the at least one first additional card, causes second play option including a fold or a second additional wager from each user device in the set of user device to be received at the memory controller hub;

cause the second play option to be stored in the memory device;

determine at least one second additional card to be added to each partial player hand of the set of partial player hands, which completes the partial player hand;

cause the at least one second additional card to be added to each partial player hand of the set of partial player hands to be stored in the memory device;

provide the at least one second additional card to the user device associated with the partial player hand to which the at least one second additional card is added;

cause a set of complete player hands to be stored in the memory device, the set of complete player hands including the set of partial player hands, the at least one first additional card added to each partial player hand of the set of partial player hands, and the at least one second additional card added to each partial player hand of the set of partial player hands;

compare, with the processor, each complete player hand of the set of complete player hands against a plurality of predetermined winning outcomes; and resolve the ante wager, first additional wager, and second additional wager of each complete player hand of the set of complete player hands solely against the plurality of predetermined winning outcomes and not against a dealer hand.

14. The system of claim 13, wherein the wagering elements are play-for-fun credits.

15. The system of claim 13, wherein the set of instructions further causes the processor to award a quantity of the wagering elements to the set of players based on a hierarchy of the players within the set of players.

16. A system for managing play of a wagering game, comprising:

a communications interface configured for communicating with a set of user devices and a set of players, each player of the set of players associated with a user device of the set of user devices;

a memory controller hub;

a memory device for storing data;

a processor configured to execute instructions; and a set of instructions stored on a non-transitory computer-readable medium, that when executed by the processor causes the processor to:

cause an indication of an ante wager associated with a player in the set of players to participate in the wagering game from each user device in the set of user devices to be received at the memory controller hub;

cause the indication of the ante wager to be stored in the memory device;

determine a set of partial player hands, each partial player hand including a number of randomized playing cards from a set of playing cards and each partial player hand associated with a player and an associated user device;

cause the set of partial player hands to be stored in the memory device;

provide each partial player hand to the user device associated with the partial player hand for display on the associated user device;

cause a first play option including a fold or a first additional wager from each user device in the set of user devices to be received at the memory controller hub;

cause the first play option to be stored in the memory device;

determine at least one first additional card to be added to each partial player hand of the set of partial player hands, which is insufficient to complete the partial player hand;

cause the at least one first additional card to be added to each partial player hand of the set of partial player hands to be stored in the memory device;

provide the at least one first additional card to the user device associated with the partial player hand to which the at least one first additional card is added;

responsive to receiving the first additional wager and providing the at least one first additional card, cause a second play option including a fold or a second additional wager from each user device in the set of user devices to be received at the memory controller hub;

cause the second play option to be stored in the memory device;

determine at least one second additional card to be added to each partial player hand of the set of partial player hands, which completes the partial player hand;

cause the at least one second additional card to be added to each partial player hand of the set of partial player hands to be store in the memory device;

provide the at least one second additional card to the user device associated with the partial player hand to which the at least one second additional card is added;

cause a set of complete player hands to be stored in the memory device, the set of complete player hands including the set of partial player hands, the at least one first additional card added to each partial player hand of the set of partial player hands, and the at least one second additional card added to each partial player hand of the set of partial player hands;

combine the ante wager, first additional wager, and second additional wager to a first pot;

compare each complete player hand of the set of complete player hands against predetermined premium poker rankings;

award the first pot to a player associated with a predetermined premium poker ranking and when no premium poker ranking is achieved, not awarding the pot;

compare each complete player hand of the set of complete player hands against a plurality of predetermined winning outcomes; and resolve the ante wager, first additional wager, and second additional wager of each complete player hand of the set of complete player hands solely against the plurality of predetermined winning outcomes and not against a dealer hand from funds in the first pot.

17. The system of claim 16, wherein the set on instructions further causes the processor to receive from each user device a mandatory poker bet and combining all mandatory poker bets into a second pot that is awarded to a player holding a highest ranking hand amongst the set of players at the conclusion of a round of play.

18. The system of claim 16, wherein the set of instructions further causes the processor to:

add the first additional wager and second additional wager to the first pot; and award a portion of the first pot based on occurrence of a predetermined event.

19. The system of claim 18, wherein a rake is collected from the wagers added to the first pot.

20. The system of claim 18, wherein the predetermined event is selected from the group consisting of a predetermined number of hands, a predetermined number of rounds, a predetermined time limit, and a predetermined amount in the first pot.

21. The system of claim 18, wherein the predetermined event is a player hand meeting a qualifying hand or better.

22. The system of claim 18, wherein the first pot is a progressive pot.

23. A computer-implemented method of managing play of a wagering game by a processor in communication with a user device operated by a player, comprising:

receiving, with a processor, a video feed from a camera, the video feed depicting a dealer, a card handling system configured to output cards from a set of playing cards, and a play area;

providing the video feed to the user device;

receiving, at a memory controller hub, an indication of an ante wager associated with the player in the set of players to participate in the wagering game from the user device;

storing the indication of the ante wager in a memory device;

determining, with the processor, a partial player hand from card information including a number of randomized playing cards dealt to the play area from the card handling device from the set of playing cards;

storing the partial player hand in the memory device;

providing, with the processor, the partial player hand to the user device for display on the user device;

receiving, at the memory controller hub, a first play option including a fold or a first additional wager from the user device;

determining, with the processor, card information of at least one first additional card to be added to the partial player hand in the play area dealt from the card handling system from the set of playing cards, the at least one first additional card being insufficient to complete the partial player hand;

storing the at least one first additional card to be added to the partial player hand;

providing, with the processor, the at least one first additional card to the user device;

responsive to receiving the first additional wager and determining the at least one first additional card, receiving, at the memory controller hub, a second play option including a fold or a second additional wager from the user device;

storing the second play option in the memory device;

determining, with the processor, card information of at least one second additional card to be added to the partial player hand in the play area dealt from the card handling system from the set of playing cards, the at least one second additional card completing the partial player hand;

storing the at least one second additional card to be added to the partial player hand in the memory device;

providing, with the processor, the at least one second additional card to the user device;

storing a complete player hand in the memory device, the complete player hand including the partial player hand, the at least one first additional card added to the partial player hand, and the at least one second additional card added to the partial player hand;

comparing, with the processor, the complete player hand against a plurality of predetermined winning outcomes; and resolving the ante wager, first additional wager, and second additional wager of the complete player hand solely against the plurality of predetermined winning outcomes and not against a dealer hand.

24. The method of claim 23, further comprising providing an indication of play options for display on a dealer display viewable by the dealer.

25. The method of claim 23, wherein the card information is received by the processor from the card handling system.

26. The method of claim 23, further comprising providing the card information to the user device for display to the player.

27. The method of claim 23, further comprising receiving an audio feed from a microphone capturing audio from the dealer and play area; and transmitting the audio feed to the user device.

28. A computer-implemented method of managing play of a wagering game by at least one processor in communication with one or more players each associated with a user device, comprising:

receiving, at a memory controller hub, an indication of an ante wager to participate in the wagering game from one or more players via one or more respective user devices;

storing the indication of the ante wager in a memory device;

selecting and displaying on each user device, with the at least one processor, a partial player hand including a number of randomized playing cards from a set of playing cards;

storing the partial player hand in the memory device;

receiving, at the memory controller hub, a first play option including a fold or a first additional wager instruction from each user device;

storing the first play option in the memory device;

providing and displaying at each user device from which a first additional wager instruction was received, with the at least one processor, at least one first additional card to be combined with the partial player hand which is insufficient to complete the partial player hand;

storing the at least one first additional card to be combined with the partial player hand in the memory device;

receiving, at the memory controller hub, a second play option including a fold or a second additional wager instruction from each user device from which a first additional wager instruction was received;

providing and displaying at each user device from which a second additional wager instruction was received, with the at least one processor, at least one second additional card to be combined with the partial player hand which completes the participating partial player hand;

storing the at least one second additional card to be combined with the partial player hand;

storing a complete player hand in the memory device, the complete player hand including the partial player hand, the at least one first additional card combined with the partial player hand, and the at least one second additional card combined with the partial player hand;

comparing, with the at least one processor, the complete player hand against a pay table of redetermined winning outcomes; and resolving, with the at least one processor, the ante wager, first additional wager, and second additional wager of the complete player hand solely against the pay table of predetermined winning outcomes and not against a dealer hand.

29. A system for managing play of a wagering game, comprising:

at least one processor configured to execute instructions;

a memory controller hub;

a memory device for storing data;

a communication interface in information communication with the at least one and memory controller hub, the communication interface configured for communicating with one or more user devices of one or more associated players; and a set of instructions stored on a non-transitory computer-readable medium that, when executed by the at least one processor, causes the at least one processor to:

cause an indication of an ante wager to participate in the wagering game from the one or more players via the one or more user devices to be received at the memory controller hub;

cause the indication of the ante wager to be stored in the memory device;

select and display on each user device a partial player hand including a number of randomized playing cards from a set of playing cards;

cause the partial player hand to be stored in the memory device;

cause a first play option including a fold or a first additional wager instruction from each user device to be received at the memory controller hub;

provide for display at each user device from which a first additional wager instruction was received at least one first additional card to be combined with the partial player hand, the at least one first additional card being insufficient to complete the partial player hand;

cause the at least one first additional card to be combined with the partial player hand to be stored in the memory device;

cause a second play option including a fold or a second additional wager instruction from each user device from which a first additional wager instruction was received to be received at the memory controller hub;

provide for display at each player user device from which a second additional wager instruction was received at least one second additional card to be combined with the partial player hand, the at least one second additional card completing the participating partial player hand;

cause the at least one second additional card to be combined with the partial player hand to be stored in the memory device;

cause a complete player hand to be stored in the memory device, the complete player hand including the partial player hand, the at least one first additional card combined with the partial player hand, and the at least one second additional card combined with the partial player hand;

compare the complete player hand against a pay table of predetermined winning outcomes; and resolve the ante wager, first additional wager, and second additional wager of the complete player hand solely against the pay table of predetermined winning outcomes and not against a dealer hand.

* * * * *